FIG. 1

Dec. 7, 1948.   H. M. McCOY   2,455,378
MECHANISM AND CONTROLS FOR CONTROLLABLE AIRCRAFT
PROPELLERS; COMPLETE PROPELLER
WITH AUTOMATIC CONTROL
Filed Nov. 27, 1943   5 Sheets-Sheet 2

FIG. 1a

INVENTOR
HOWARD M. McCOY
BY Joseph Th. Hayell and
Clyde Koontz
ATTORNEYS

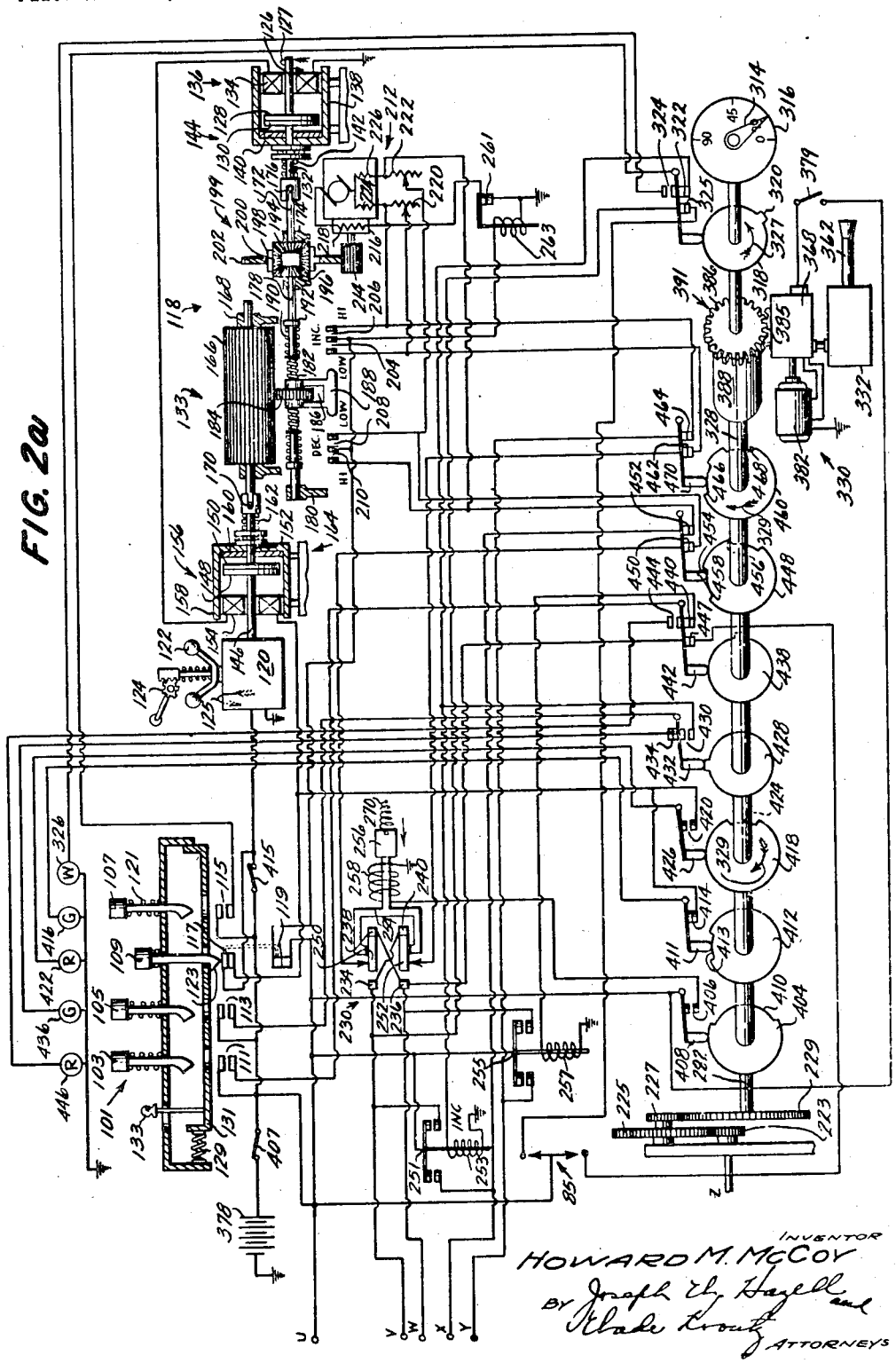

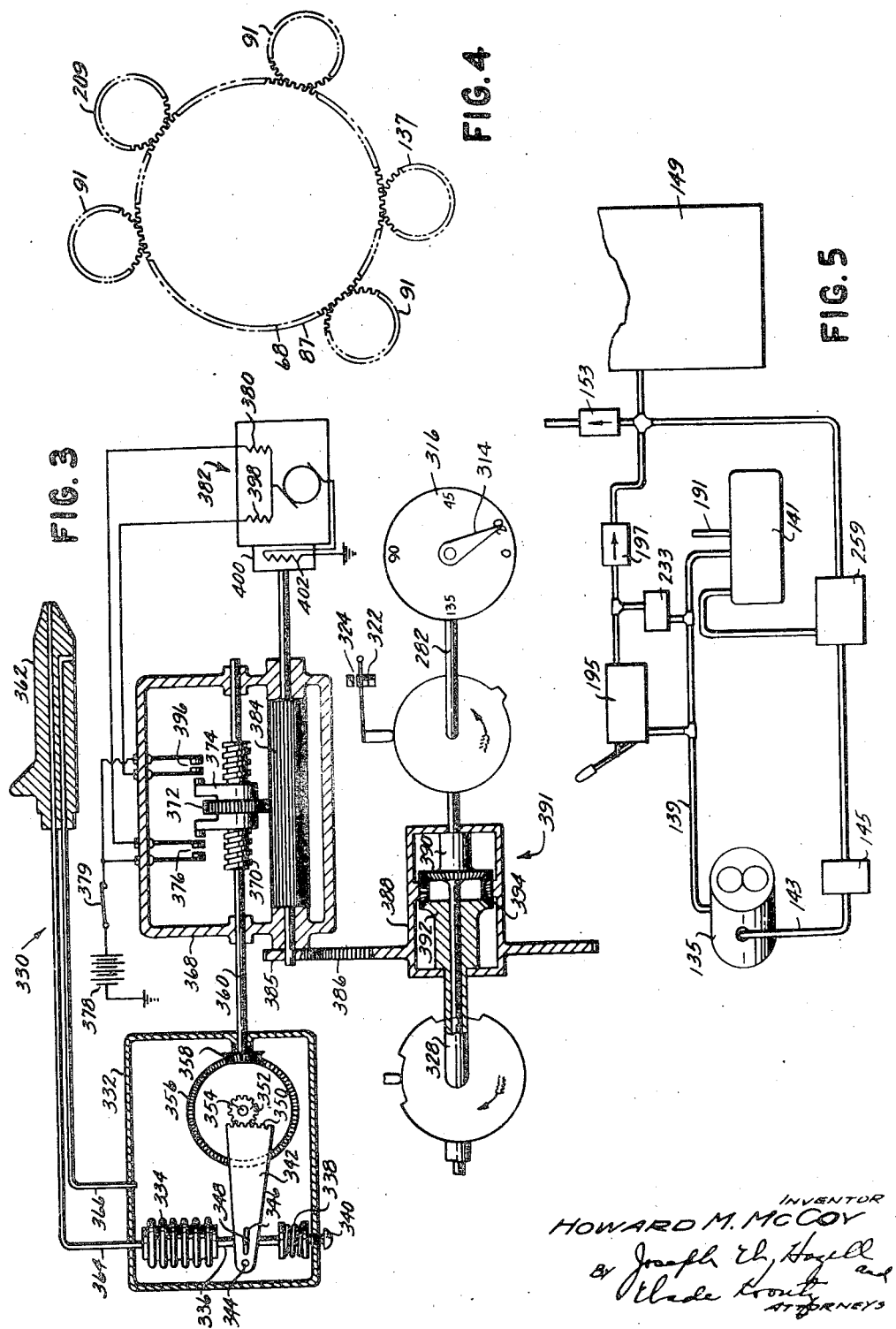

Patented Dec. 7, 1948

2,455,378

UNITED STATES PATENT OFFICE 2,455,378

MECHANISM AND CONTROLS FOR CONTROLLABLE AIRCRAFT PROPELLERS; COMPLETE PROPELLER WITH AUTOMATIC CONTROLS

Howard M. McCoy, Patterson Field, Ohio

Application November 27, 1943, Serial No. 511,935

38 Claims. (Cl. 170—163)

(Granted under the act of March 3, 1883, as amended April 30, 1928; 370 O. G. 757)

The invention described herein may be manufactured and used by or for Government for governmental purposes, without the payment to me of any royalty thereon.

This invention relates to adjustable pitch propellers for aircraft, and particularly to mechanism whereby the blade-pitch may be controlled manually over a wide range, extending from a full-feathering pitch-angle through the zero thrust position into the negative pitch range which is employed, both in flight and in landing, for propeller braking, or controlled automatically through all positive blade angles used in normal flight, as well as through the negative blade angles mentioned.

As is well known, when certain flight conditions necessitate a considerable change in pitch-angle, as in full feathering or in propeller braking, the change is desirably made in a minimum of time. The employment of manually operable pitch-change mechanism for making these changes at a rate as high as forty degrees per second is considered good practice.

In normal flight, the necessary changes in pitch-angle for maintaining a selected constant engine speed are usually so small that they may be made at a much lower rate. Automatically governed pitch-change mechanism for making these small changes at a rate of approximately four degrees per second has been found adequate to satisfy this requirement.

Certain flight maneuvers, however, particularly in military aircraft, often require quick and relatively extensive changes in engine throttle setting causing temporary large R. P. M. variations from the equilibrium, or "on speed" setting of the engine, and these maneuvers therefore call for such a considerable change in pitch-angle setting in such a relatively short period of time that means are preferably made available whereby the automatic governing mechanism may utilize the higher rate of pitch change when such extensive changes in throttle setting occur.

Since the energy required for making the larger pitch changes in such short periods of time is considerable, the engine itself has often been chosen as the prime source of this energy, but since the execution of large pitch-changes usually occur only at short, widely spaced intervals, it may be preferable not to take the required energy for effecting the large pitch-changes directly from the engine and thus perhaps aggravate an off-speed condition which it is aiming to correct, as when the engine is already underspeeding, but instead to draw from the engine a small amount of energy gradually and store it, electrically or hydraulically, against the time when the larger and faster pitch-changes must be made.

It is therefore an object of the invention to provide and drivably connect to the engine, as part of the system, either a small generator or a small pump, for respectively charging either an electric battery or a hydraulic accumulator, then making the larger pitch changes by employing the accumulated energy in larger volume, since the demand occurs only at short and considerably spaced-apart intervals.

Another object of the invention is to provide a propeller-pitch-change mechanism with electric or hydraulic power means, to change the pitch at a high or low rate as required in any of the aforementioned situations, the power means optionally comprising either two reversible servomotors of different power and speed reducing capacities, or a single reversible servomotor having two speed-ratings, the servomotors being controlled by a governing mechanism which is sensitive to off-speed conditions of different magnitudes, and which has capacity to select the high or the low speed ratio pitch-changing power means as required by the greater or less off-speed condition, in order to maintain a selected constant engine speed under varying engine power and airplane flight conditions.

Another object of the invention is to provide a compact and simplified push button control mechanism having one push button operable to place both the high and the low rate pitch-change mechanism under the control of the governor, a second operable to full feather the propeller at the high rate of pitch change, and a third and fourth operable respectively to adjust the propeller into and out of the negative or braking pitch range at the high rate of pitch change.

Since the functions of the four push buttons above named are primarily to change the blade pitch through a large angle at a high rate and stop at a definite pitch station such as at the feathering pitch, or midway of the flight range, or midway of the braking range, it is highly difficult to release any push button at any very exact pitch angle.

It is therefore another object of the invention to provide a series of automatic pitch limit stops which, regardless of whether a given push button is held or released, the automatic stops will arrest pitch change, as for instance, if pitch-change is initiated by the feathering button, the automatic stop will arrest it at the feathering angle, if initiated by the braking push button, it will be arrested midway of the braking range, and by the unbraking button, midway of the flight range, etc., to the end that dependence in the human element in stopping at the desired pitch angle may be avoided.

The manual push-button-start-and-automatic-stop control, however, contemplates stopping at the several stations designated, but there are occasions where pitch change is desirably stopped at an exact angle but for which there is no automatic stopping means.

It is therefore another object of the invention to provide a double-throw manual switch arranged for manually operating the low-speed pitch change mechanism in either direction, whereby more accurate manual pitch settings may be made when required.

In providing the automatic stop means hereinbefore mentioned for arresting pitch change at preselected stations, consideration must be given the fact that the feathering angle is always at ninety degrees from actual zero pitch, regardless of any variation in the air speed, whereby any automatic stop means for arresting the pitch at the feathered position must operate as a direct function of pitch change without regard to air speed. This is true also of any device for visibly recording the actual pitch.

On the other hand, pitch limit stop means, for arresting the pitch midway of the flight range or midway of the braking range, may not be arranged to operate as a direct function of the pitch, but may preferably be modified by an air-speed-sensitive mechanism, since both of these mid points shift as the air speed rises and falls. Similarly any visible signals for indicating that these mid points have been reached should preferably be for the same reason subject to correction by an air-speed-sensitive device.

It is therefore another object of the invention to provide two associated pitch arresting and indicating mechanisms, the one being drivably connected to the blades and thereby operating as a direct function of pitch change, for arresting pitch at the feathering angle and for operating the actual pitch indicating means, and the other also drivably connected to the blades, but through an air-speed-sensitive mechanism which modifies the mid points at which pitch is arrested by the several stops as a function of air speed.

In common practice, where automatic governing of blade-pitch is employed, the blade-pitch is increased or decreased as a function of engine speed by appropriate governing apparatus, and, since such apparatuses may in rare instances malfunction, it is customary to provide pitch limit stops, one for arresting pitch change when a predetermined low pitch angle is reached, which for example may be approximately plus fifteen degrees, and another for arresting pitch change when a predetermined high pitch angle is reached, which in the same example may be approximately plus fifty-five degrees. These pitch limit stops are selectively fixed, and this considerable range of blade-angle-change, i. e., forty degrees in the instant example, between the low and the high limit stops, is necessary for the reason that at zero forward velocity of the aircraft, as for instance, at the beginning of take-off, a blade pitch of about plus fifteen degrees may be needed to allow the engine to develop full power at take-off R. P. M., while at a high velocity of say five hundred M. P. H., a fifty-five degree blade angle may be provided, because it is about that which is required to hold the same engine down to substantially the same safe speed. It will be readily seen that, should the governing mechanism malfunction, the blade-angle may be turned to as much as fifty-five degrees before it is arrested by the high pitch-limit stop, and when this occurs shortly after take-off when the pitch-angle should still be relatively low, quite frequently the engine is stalled and a crash results. Conversely, if the governor, in malfunctioning, decreases the blade-angle until it is arrested by the fifteen degree low limit stop, and this occurs at five hundred M. P. H., when the pitch angle should be at its highest, the engine will be wind-milled by the propeller at a catastrophic speed. In fact, with the propeller pitch fixed at fifteen degrees, a plane velocity of only one hundred M. P. H. creates a windmilling condition which results in an engine R. P. M. which is usually dangerous, if continued indefinitely.

It is therefore another object of this invention to overcome the above fault by omitting the usual widely spaced and fixed pitch limit stops which, in the example given, merely prevent the pitch angle being adjusted below fifteen or above fifty-five degrees, and substituting pitch-limit stopping means which are spaced a relatively few degrees apart, say for example ten degrees, and instead of being fixed, are movable by the hereinbefore mentioned air-speed-sensitive pitch arresting mechanism bodily in unison relative to the actual pitch as a function of air speed, so that the stopping means are always set to arrest pitch-change at a pitch-angle which is no more than five degrees below or five degrees above any pitch-setting which is correct for the then existing air speed, whereby any malfunctioning of the governor at a low air speed, say shortly after take-off when a proper pitch angle may be about twenty degrees, while it may result in a change in the pitch setting, the change when made will not be to an angle less than fifteen degrees nor to an angle greater than twenty-five degrees while the craft records an air speed which properly calls for the twenty degree pitch-angle. Similar malfunctioning, when the craft is moving at top speed, when a proper pitch-angle may be as much as forty-five degrees, while also resulting in a change in pitch setting, such setting could not be to an angle less than forty nor greater than fifty degrees unless and until the air speed of the craft came down to where a lower pitch angle was appropriate. By this means propeller pitch may never unintentionally get so far out of correspondence with air speed as to cause serious underspeeding or overspeeding of the engine. It will be understood, of course, that overspeeding is the more serious condition as regards direct engine damage.

Under certain conditions of governor malfunctioning there will, of course, be some overspeeding, but the limit stops may be so adjusted, relative to each other and to the actual blade setting, as to limit such overspeeding to a minimum. Time is thereby afforded for withdrawing pitch control from the damaged or defective governor and substituting manual control by which a blade pitch corresponding to the then existing flight condition may be selected.

The practice of employing a variable pitch propeller for braking, both when landing and in flight maneuvers, is currently becoming more general and, while it is just as important that the same control of the blade pitch be exercised when braking is being effected, in order to maintain a selected uniform engine speed all during the braking operation, no known mechanism is presently available which is operative where the propeller is in the reverse pitch range, to correct "off-speed" conditions of the engine by automatically controlling the blade pitch. It is noted, however, that if the same governor is to be employed for controlling the blade pitch when operating in the negative pitch range as is employed when operating in the positive pitch range, the sense of the governor must be reversed as the propeller pitch passes the angle of zero thrust. If this is done, the governor, when sensing an "off-speed" condition in the positive range, will adjust the blade in the opposite direction as when the same "off-speed" condition is encountered in the negative range.

Now the negative blade angle for braking must, of course, be different for different air speeds to maintain a selected uniform engine speed whereby the negative braking range may extend over a considerable angular distance; and if set pitch change limit stops were employed, the same difficulty of over-speeding and under-speeding in case of governor malfunctioning would develop. It is therefore another object of this invention to provide mechanism which will change the governor sense in the manner above indicated as it passes the angle of zero thrust and additionally overcome the objection to set pitch limit stops in the braking range in the same manner as hereinbefore explained with respect to normal flight range; that is, by providing pitch limit stop means which are placed a relatively few degrees apart and movable bodily as a function of air speed. Since the angle of zero thrust at which the sense of the governor must change varies with the air speed, it is still another object to so arrange the mechanism which is provided for changing the governor sense as to bring it under the control of the air-speed-sensitive device hereinbefore mentioned whereby the sense of the governor will change at a blade angle which varies with the air speed.

Further objects and advantages will appear as the invention is further described and reference is had to the drawings, wherein:

Figure 1 and Figure 1a are the two parts of a schematic view of a complete variable pitch propeller system and its wiring diagram, in which the pitch-change mechanism is controlled largely by electric motors;

Figures 2 and 2a are the two parts of a schematic view similar to Figures 1 and 1a except that the pitch change mechanism is controlled in part by hydraulic motors;

Figure 3 is a schematic view showing in detail an air speed responsive mechanism used in the operation of the systems shown in Figures 1, 1a, 2 and 2a;

Figure 4 is a diagram showing the general arrangement of the hydraulic pump and motors used in the mechanism shown in Figures 2 and 2a; and Figure 5 shows an alternate means of controlling the storage of the operating fluid.

Similar numerals refer to similar parts throughout the several views.

Figure 2:
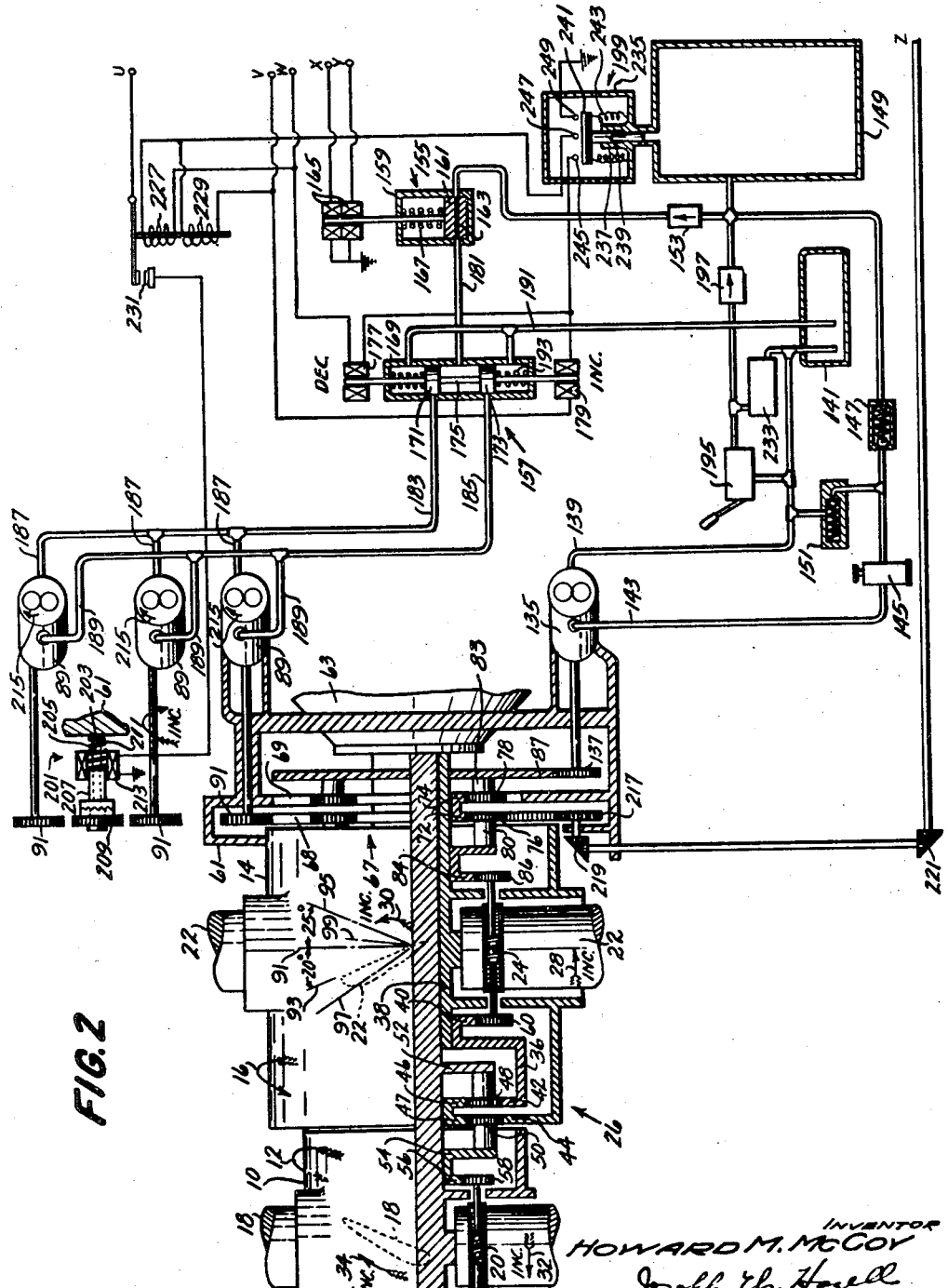

The dual rotation propeller, which is selected as an illustrative embodiment of this invention, comprises an outboard or front propeller hub 10, rotatable clockwise, as indicated by the arrow 12, and an inboard or rear propeller hub 14, rotatable anticlockwise, as indicated by the arrow 16. When the terms "clockwise" or "anticlockwise" are hereinafter employed they shall be intended to mean clockwise or anticlockwise when viewed from right to left in the drawing. The relatively heavy gearing required for connecting the front and rear hubs to each other, and to the engine, for opposite rotation, is not shown.

Supported on the front hub 10, the blades 18 are rotatable about their axes by the worm 20, while similar blades 22 are carried on the rear hub 14 and are rotatable about their axes by the worm 24. Worms 20 and 24, in the instant embodiment, are both right hand.

A relatively light weight gear-set 26, which, for convenience in description, may be referred to as the dual rotation gear-set, is provided for drivably connecting the worms 20 and 24 to each other, this gearing being so arranged that when the worm 24 is rotated to turn the blades 22 in a pitch increasing direction, as indicated by the arrow 28 or 30, the worm 20 will be rotated to turn the blades 18 in a pitch increasing direction, as indicated by the arrow 32 or 34, the same result being achieved whether the hubs 10 and 14 are stationary or are in a state of opposite rotation about the axis of the hubs 10 and 14.

The gear-set 26 includes a cylindrical member 36 which is freely rotatable on a sleeve portion 38 of the rear hub 14, and comprises integrally an external gear 40 and an internal gear 42, a second internal gear 44 integral with the rear hub 14, a pair of drivably joined sun gears 46 and 47 freely rotatable on a portion of the front hub 10, two planet pinions 48 and 50 meshing respectively with the internal gears 42 and 44 and the drivably connected sun gears 46 and 47, and two planet pinion carriers 52 and 54 for respectively rotating the planet pinions 48 and 50 on their axes while revolving them around the sun gears 46 and 47 and within the ring gears 42 and 44. Carrier 52 is fast on a portion of the hub 10 while carrier 54 is freely rotatable thereon. Carrier 54 has an external gear 56 integral. Pinions 58 and 60 drivably connect the gear-set 26 to the worms 20 and 24, respectively, whereby rotation of the worm 24 rotates the worm 20 equally but oppositely whether the hubs 10 and 14 are stationary or are rotating oppositely. This system of connecting the two parts of a dual rotation propeller for unitary blade adjustment is shown and described in my copending application Serial No. 513,611, filed December 9, 1943, now Patent No. 2,367,230, issued January 16, 1945.

At the rear end of the propeller hub 14 a housing 62 is nonrotatably supported on the nose 64 of the engine by screws 66. A planetary differential gear-set 65, which may, for convenience, be called the pitch-change gear-set, includes a pair of ring gears 68 and 70, each having both external and internal teeth. Gears 68 and 70 are rotatable about the axis of the hubs 10 and 14.

Two drivably connected sun gears 72 and 74 are freely rotatable on the inner sleeve of the hub 14. Planet pinions 76 and 78 are in mesh with the internal teeth of the ring gears 68 and 70 and the external teeth of the sun gears 72 and 74, respectively. Carriers 80 and 82, respectively, support the pinions 76 and 78, both for rotation on their axes and for revolution about the sun gears 72 and 74 and within the ring gears 68 and 70.

Carriers 80 and 82 are both concentrically carried on the inner sleeve of the rear hub 14, the carrier 82 being fast on the sleeve for unitary rotation therewith while carrier 80 is freely rotatable thereon. An external gear 84 is secured to the carrier 80 to rotate therewith and meshes with a pinion 86 which is fast on the shaft of the worm 24.

It is noted that, with a pitch-change gear-set 65 constructed and arranged as shown, the pitch-change worm driving gear 86 is rotated clockwise either by anticlockwise rotation of the ring gear 68 while the ring gear 70 stands idle, by clockwise rotation of the ring gear 70 while the ring gear 68 stands idle, or by anticlockwise rotation of ring gear 68 and clockwise rotation of ring gear 70 at the same time. In order that the effect of the two ring gears may be additive they must rotate in opposite directions.

Two servomotors 88 and 90, the first preferably of considerably greater power capacity than the second, are provided for rotating the ring gears 68 and 70 to change the pitch. The motor 88 carries a pinion 92 which meshes directly with the external teeth of the ring gear 68 for changing the pitch at a high rate, while the motor 90 is drivably connected to the external teeth of the ring gear 70 through the speed reducing gears 94, 96, 98 and 100 for changing the pitch at a low rate. Motors 88 and 90 are provided respectively with brakes 102 and 104 which are spring engaged so as normally to hold the rotors of the motors nonrotative, but each brake is provided with a brake-disengaging solenoid, the coil of which is in series with its motor winding, whereby a brake becomes disengaged simultaneously with the application of an electric current to the motor winding, and engaged instantly the current is broken.

Figure 1:
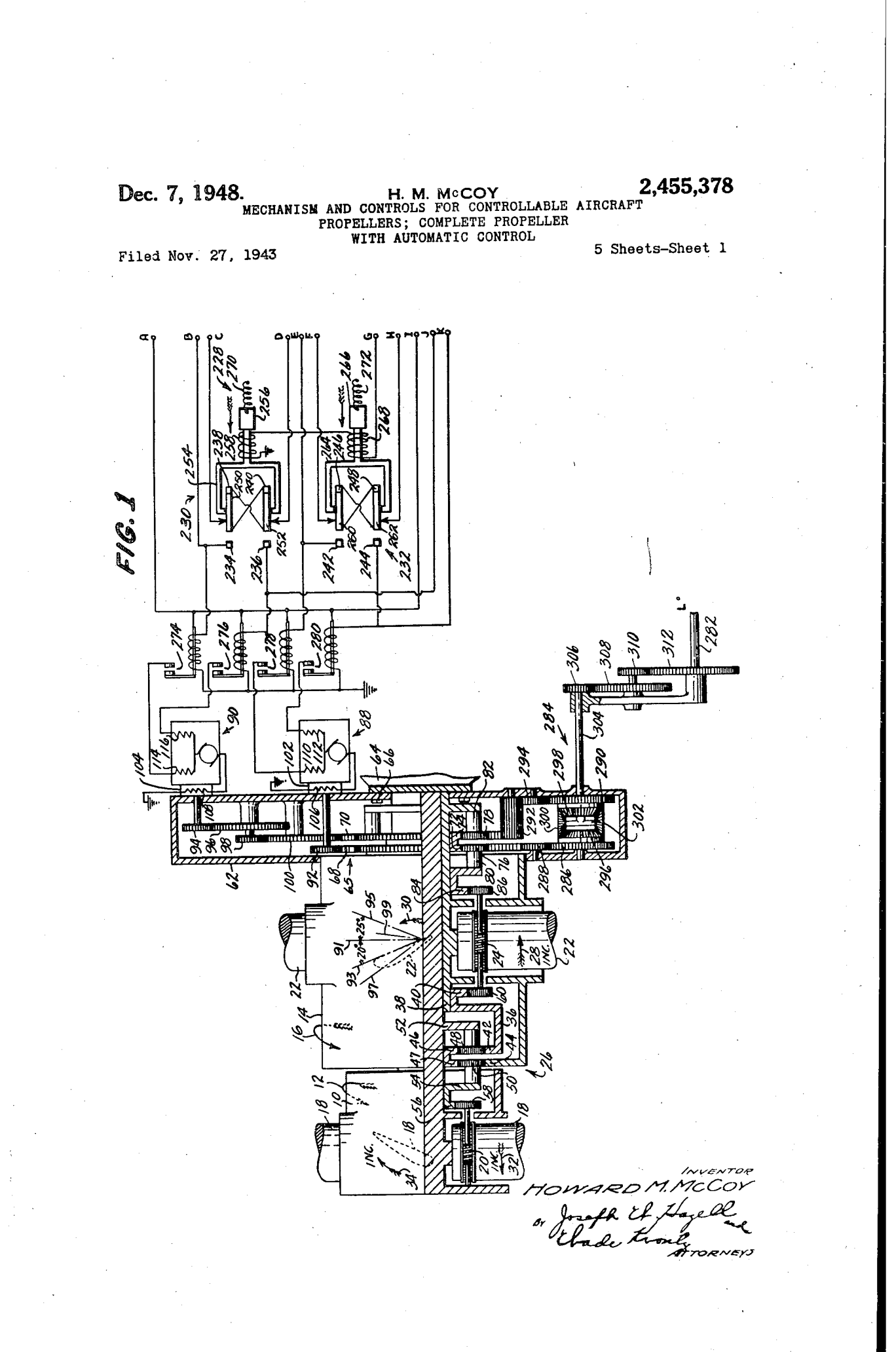

In the wiring diagram of Fig. 1, the solenoid coils 106 and 108 are provided respectively to disengage the brakes 102 and 104, the motor 88 being provided with field coils 110 and 112, while the motor 90 has similar field coils 114 and 116. The two field coils of each motor are of opposite polarity, whereby reversal of either of the motors 88 or 90 is obtained by selectively energizing one or the other of its coils.

The pitch-change gear-set 65, its operating motors, and its windings are shown and described in my copending application Serial No. 498,050, filed August 10, 1943, now Patent No. 2,370,675, issued March 6, 1945.

For controlling the servomotors 88 and 90, a push button control set 101 is provided. Set 101 comprises four push buttons 103, 105, 107 and 109, manually operable for closing the switches 111, 113, 115 and 117. Button 109, coincidentally with the closing of the switch 117, closes also the switch 119. Compression springs 121 are provided for returning the push buttons to their unoperated positions.

For the push buttons 103, 105 and 107, no mechanical means is provided for holding them down against the action of the springs 121, but for push button 109, a hook 123 engages the underside of a slot which extends through a plate 131, whereby button 109, when depressed, is held down by the plate until the button is intentionally released by lateral movement of the plate. Button 109 may be released by manipulation of the knob 133, movement of which is resisted by the spring 129.

Push button 103 should preferably be marked Brake, since it is used to hold the switch 111 closed for energizing the coil 112 of the high rate pitch-change servomotor 88, for rotating the gear 92 anticlockwise, thereby turning the blade 22 in a direction opposite the arrow 30 into the negative or braking range. Cooperating means, hereinafter described, are provided for stopping movement of the blade 22 when it has reached a midway position in the braking range, in case the pilot does not voluntarily release the push button 103 at the proper instant.

Push button 105 should preferably be marked Unbrake, since it is used to hold the switch 113 closed for energizing the coil 110 of the high rate pitch-change servomotor 88 for rotating the gear 92 clockwise, thereby turning the blade 22 in the direction of the arrow 30 into the positive or cruising range. Cooperating means, hereinafter described, are provided for stopping movement of the blade 22, when it has reached a midway position in the cruising range, in case the pilot does not voluntarily release the push button 105 at the proper instant.

As a basis for further description, the blade 22 is shown with its mean plane on the line 93, which is at a pitch-angle of plus 20 degrees from the 0 pitch line 91. Line 93 will be considered the mid point of the low-speed flight-range. For the same purpose, the line 95 may represent the mid point of the low-speed braking-range. As will be later explained, however, these mid points vary with changes in air speed, as for instance, at an air speed which is near the possible maximum, the mid point of the flight-range may shift about 20 degrees to the line 97, and that of the braking-range about 20 degrees to the line 99. These blade angles are arbitrarily selected for explanation only, and may vary in different aircraft.

Push button 107 may preferably be labeled Feather, since it is employed to hold the switch 115 closed for energizing the coil 110 of the high rate pitch-change servomotor 88 for rotating the gear 92 clockwise, thereby turning the blade 22 in the direction of the arrow 30, through and beyond the positive or cruising range to the full feathered position. Cooperating means, hereinafter described, are provided, which stop pitch change when the full feathered position is reached.

Push button 109 is labeled Automatic, since it completes a series of electric circuits through an automatic pitch-change-governing mechanism, hereinafter described, which may be broadly designated by the numeral 118. Button 109 is usually pressed down and anchored for automatic operation after button 105 or 103 has been used to bring the pitch angle midway of the cruising range, or midway of the braking range, as desired.

Since the push buttons 103, 105, and 107 all operate the servomotor 88 which provides the high rate of pitch change, it is difficult to employ them to arrest pitch change at any definite angle except where the cooperating means above mentioned are provided for arresting pitch change irrespective of whether the push button is released or not.

There are occasions, however, when it becomes desirable to closely adjust the pitch to some particular angle for which there is no cooperating means to arrest pitch change, and the pilot may therefore be required to make the adjustment by observing the pitch indicator and manually stopping the servomotor when the desired pitch angle is reached. Since this may best be accomplished at the low rate of pitch change, a double-throw manual switch 85 is provided and electrically connected for controlling the low-rate servomotor 90 for operation in either direction for making these close adjustments. Automatic pitch-limit stops, hereinafter described, arrest operation of the servomotor 90 by the switch 85 in one direction when the feathering position is reached and in the other direction midway of braking range.

The automatic pitch-change-governing mechanism 118 is provided for sensing overspeed or underspeed conditions of the engine and their magnitude, and selectively operating one or the other of the two servomotors 88 or 90, in one or the other direction, to effect appropriate changes in blade-pitch, whereby the engine is brought back in minimum time to the desired speed.

The governing mechanism 118 includes a master motor 120 having any appropriate means of maintaining a selected constant speed. In the example shown, a conventional spring loaded flyball governor 122 is employed, with means 124 for selectively altering the loading to obtain the desired speed, whereby the motor speed remains constant as long as the loading is not changed. For convenience in description the master motor 120 may be assumed to rotate in the direction of the arrow 125.

Any convenient shaft, such as the shaft 126, which is rotated at engine speed by the engine being controlled, or at a speed which is a function of the engine speed, may be employed for attaching the governing mechanism to indicate the off-speed condition needing correction.

The engine driven shaft 126, which for illustrative purposes may be assumed to rotate in the direction of the arrow 127, has a friction disc 128 drivably secured to its outer end. A cooperating disc 130 is drivably secured to a shaft 132, which has slight axial movement. A coil 134, when electrically energized, draws the discs 128 and 130 into frictional engagement, thereby forming, of the discs and coil, an electromagnetically engageable clutch 136 for drivably joining the shafts 126 and 132.

A stationary cup-shaped housing 138 has a disc of brake lining 140 in the bottom. An expansion spring 142 urges the shaft 132 toward the left, and will, whenever the coil 134 is not energized, frictionally engage the disc 130 with the brake lining 140, thereby forming of the housing 138, lining 140, spring 142, and disc 130, a spring engaged brake 144 for holding the shaft 132 against rotation. Obviously, when the clutch 136 engages, the brake 144 must disengage, and vice versa.

The motor driven shaft 146 has a friction disc 148 fixed to its free end. A mating disc 150 is fast on a shaft 152, which has a small degree of axial movement. An electrical coil 154, when energized, draws the discs 148 and 150 into frictional engagement with each other. The disc 148 and 150, and the coil 154, together form an electromagnetically engageable clutch 156.

A stationary cup-shaped housing 158 has the end wall covered with some suitable friction material 160. A spring 162 urges the shaft 152 toward the right so as to frictionally engage the disc 150 with the friction material 160 whenever the coil 154 is not energized. The housing 158, friction disc 160, spring 162 and disc 150 together form a spring engaged brake 164 for holding the shaft 152 against rotation. The brake 164 always engages whenever the clutch 156 disengages.

An elongated pinion 166 is freely rotatable in bearings 168. A pin-and-slot connection 170 is used for drivably connecting the pinion 166 to the shaft 152, whereby the shaft 152 is not denied the necessary freedom of axial movement required in engaging the clutch 156 or brake 164.

A shaft 172 is rotatable in bearings 174 and is drivably connected to the shaft 132 by a pin-and-slot connection 176, whereby the shaft 132 may move axially the amount necessary to engage the brake 144 or the clutch 136.

A shaft 178 is freely rotatable in bearings 180, and carries an enlarged screw threaded portion 182 intermediate its ends. A relatively narrow pinion 184 meshes with the elongated pinion 166 and is preferably, although not necessarily, of the same pitch diameter and number of teeth. Pinion 184 is internally threaded to fit the external screw threaded part 182 and is rotatable freely in a slot 186 of a carriage 188, whereby rotation of the shaft 178 forwardly or backwardly when the pinion 184 is not rotating moves the carriage to the right or left. Springs 190 backed by collars 192 are provided to hold the pinion 184 against the ends of the screw 182, should the screw turn far enough to run the pinion off the ends of the threads, in which case the pinion will ratchet on the ends of the threads until the screw 182 is reversed. In the present embodiment, the screw 182 is made with left hand threads. The elongated pinion 166, the screw 182, the narrow pinion 184, and the carriage 188 together constitute a three part differential which controls the servomechanism and may therefore be referred to as the servo differential, and be broadly designated by the numeral 133.

Drivably secured to the interfacing ends of the shafts 172 and 178 are the bevel gears 194 and 196. A planet pinion carrier 198 supports the pinions 200 for rotation on their radial axes and for revolution about the axis of the shafts 172—178. A gear 202 is formed on the periphery of the carrier 198. The differential gear-set, comprising bevel gears 194—196, pinions 200, carrier 198 and gear 202, may collectively be referred to as the differential gear-set 199. Obviously if the carrier 198 is kept from rotating, and the shaft 172 is rotated in one direction, the shaft 178 will rotate at equal speed in the opposite direction, and if the shaft 172 is held non-rotative and the carrier 198 is rotated at a given speed, the shaft 178 will rotate in the same direction at double the carrier speed.

If the pinions 166 and 184 are of equal diameter, the pinion 184 will rotate at the speed of the master motor whenever the clutch 156 is engaged. But the speed of the shaft 178 is determined by the speed of the engine shaft 126, so that, if the engine goes off speed, the difference between the rotations of the screw 182 and the internally threaded pinion 184 will cause this pinion to move right or left and move the carriage 188 with it.

It will, of course, be understood that the screw-and-pinion differential employed in the governor mechanism produces a straight line movement of the carriage 188 which may be convenient for operating the controlling switches. It is obvious, however, that both differentials may be of the type designated by the numeral 199 by making the one bevel gear 196 fast on the constant speed motor shaft 152, the other bevel gear 194 fast on the engine driven shaft 178, and using the rotary movement of the carrier 198 to operate the control switches.

Two electric servo control switches 204 and 206 are interposed in the path of the carriage 188 in its movement to the right, a given movement of the carriage closing first the switch 204 and further movement closing the switch 206. Two additional servo control switches 208 and 210 are interposed in the path of the carriage 188 in its movement to the left, a given movement of the carriage closing first the switch 208 and further movement closing the switch 210.

The wiring of the system shown in Fig. 1 is such that when the switch 204 is closed, it effects energization of the coil 114 of the servomotor 90 for increasing the pitch of the blades 18 and 22 at a low rate; the switch 206, when closed, effects energization of the coil 110 of the servomotor 88 for increasing the pitch of the blades 18 and 22 at a high rate; the switch 208, when closed, effects energization of the coil 116 of the servomotor 90 for decreasing the pitch of the blades 18 and 22 at a low rate; and the switch 210, when closed, effects energization of the coil 112 of the servomotor 88 for decreasing the pitch of the blades 18 and 22 at a high rate.

It will be seen that, as long as the master motor 120 and the engine shaft 126 revolve in the direction of the arrows 125 and 127, respectively, and one at exactly the same speed as the other, the carriage 188 will remain stationary intermediate the switches 204 and 208 as shown, but that any overspeeding of the engine shaft 126 will cause the carriage to move to the right and increase the blade pitch to bring the engine shaft back down to speed, and any underspeeding of the engine shaft 126 will cause the carriage to move to the left and decrease the blade pitch to bring the engine shaft back up to speed. Whether the carriage, in moving to the right or the left, in response to engine shaft overspeeding or underspeeding, moves only far enough to close the switch 204 or 208 for pitch correction at a slow rate, or enough farther to also close the switch 206 or 210 for pitch correction at a fast rate, depends on the magnitude of the off-speed condition which is to be corrected. It is also obvious that when the carriage 188 has moved, let us say to the right, to a position which has closed the switch 204 for increasing the blade pitch for correcting an overspeed of the engine shaft 126, the carriage could not, with ordinary construction, be returned to the neutral position except by the engine shaft 126 becoming slightly underspeed, and in that event the carriage would move to the left until it closed the switch 208, where the carriage must necessarily remain until the shaft 126 again overspeeds. The result would be a constant oscillation of the carriage, first right to close the switch 204, then left to close the switch 208, and a continuous hunting of the engine shaft would obtain. It is to obviate such a hunting condition that the differential gear-set 199 is provided.

For operating the differential gear-set 199, a reversible motor 212 is provided, which for reasons which will later become apparent may be called the follow-up motor. The follow-up motor 212 carries a pinion 214 which meshes with the teeth of the gear 202. Motor 212 is provided with a brake 216 which is spring engaged so as to normally hold the rotor of the motor nonrotative, the brake being provided with a disengaging solenoid, the coil of which is in series with the motor winding. The brake therefore becomes disengaged coincidently with the application of an electric current to the motor winding, and engaged simultaneously with the breaking of the current. The differential gear-set 199 being thus associated with the follow-up motor may hereinafter be referred to as the follow-up differential.

In the wiring of the system herein shown, the solenoid coil 218 is provided for disengaging the brake 216, and the follow-up motor is provided with field coils 220 and 222 of relatively fine wire, and field coils 224 and 226 of relatively coarse wire, the field coils being connected in series-parallel, as shown. Obviously, if current of a given voltage is passed through either the coil 224 or the coil 226 alone, the motor will rotate many times as fast under a given load as when current of the same pressure is applied to coils 220 and 224 in series or 222 and 226 in series, whereby two rates of follow-up are provided corresponding in a measure to the two rates of pitch-change provided by the servomotors. Taps may preferably be provided on the fine wire coils 220 and 222, whereby the ampere turns of the field winding may be varied to vary the proportion between the low and the high rate of follow-up and to permit ready adjustment of follow-up speed, depending on the response characteristics of a given engine-propeller combination.

The electrical connections of the system of Fig. 1 are such that, coincidentally with the closing of the governor-operated switch 204 by the carriage 188, due to overspeeding of the engine shaft 126, the pitch increasing coil 114 of the low rate servomotor 90 turns it anticlockwise for a low rate of pitch-increase, and the series-connected coils 220 and 224 of the follow-up motor 212 turn it anticlockwise for returning the carriage 188 at a slow rate to the neutral position shown, and if the off-speed condition is extensive enough to have closed the switch 206, the pitch increasing coil 110 of the high rate servomotor 88 turns it clockwise for a high rate of pitch-increase, while the coarse wire coil 224 of the follow-up motor 212 turns it anticlockwise for returning the carriage at a high rate to the neutral position shown.

Conversely, when underspeeding of the engine shaft 126 has caused the carriage 188 to move far enough to the left to close the switch 208, the pitch-decreasing coil 116 of the low rate servomotor 90 turns it clockwise for a low rate of pitch-decrease, and the series-connected coils 222 and 226 of the follow-up motor 212 turn it clockwise for returning the carriage 188 at a slow rate to the neutral position shown, and if the off-speed condition is extensive enough to have closed the switch 210, the pitch-decreasing coil 112 of the high rate servomotor 88 turns it anticlockwise for a high rate of pitch-decrease, while the coarse wire coil 226 of the follow-up motor 212 turns it clockwise for returning the carriage at a high rate to the neutral position shown.

From the foregoing description of the governing mechanism, it will be seen that when, for instance, an overspeed condition of the engine shaft 126 moves the carriage 188 to the right to operate the servomotor 90 for pitch-increase, it is not necessary that the carriage stay in the closed-switch position until the pitch increases enough to bring the shaft 126 to underspeed before the carriage may move left. Instead, the follow-up motor 212, through the differential gear-set 199 starts to return the carriage 188 to the neutral position shown as soon as pitch-correction begins, with a result that overcorrection and consequent hunting can not take place.

An automatic governing mechanism, similar to that just described, is shown in my copending application, Serial No. 475.297, filed February 9, 1943, now Patent No. 2,399,685, dated May 7, 1946, for Differential speed responsive device. The present arrangement is an improvement over the said copending application, in that it not only senses and corrects an off-speed condition of the device being regulated, but senses also the magnitude of the off-speed condition and corrects at a rate of speed commensurate with the off-speed condition which is found to exist.

The foregoing description of the governing mechanism which has been provided for controlling the blade-pitch, so as to keep the engine speed constant and at the speed selected, has referred only to the control of the blade-pitch when operating in the positive pitch range; that is, the range used in normal flight. It has been stated, however, as being an object of this invention to automatically maintain a constant engine speed while the propeller is being employed as a brake.

In the negative as in the positive pitch range, engine speed is brought down by pitch increase and allowed to rise by pitch decrease. It is noted, however, that a direction of rotation which produces pitch increase in the positive range, produces pitch decrease in the negative range and vice versa, the term "pitch decrease" being hereinafter intended to mean a change in the blade angle from any position in either the positive range or the negative range toward the angle of zero thrust.

Mechanism is therefore provided for use in propeller braking, which will so change the electrical connections between the governor and the servomotors that when, in braking, the governor senses a need for increased R. P. M., it energizes the coil of the servomotor, which, in normal flight, is energized for pitch-increase, and when, in braking, the governor senses a need for decreased R. P. M., it energizes the coil of the servomotor which, in normal flight, is energized for pitch-decrease. These changes in governor-to-servomotor connections for braking are preferably made just as the blade-angle leaves the positive-pitch-range and enters the negative-pitch-range. It is noted, however, that the dividing line between the pitch-range, in which propeller rotation retards forward movement of the craft, and the pitch-range in which it assists its movement, is not usually at zero blade-angle, but is actually at the angle of zero thrust of the propeller, which varies with the velocity of the craft. Thus, the angle of zero thrust may be at zero blade-angle before take-off when the craft is stationary, but may be at a blade-angle of as much as plus 20 degrees when the craft is moving at maximum speed. An air-speed-responsive mechanism which will be subsequently described is provided for determining the blade angle at which the control-reversing mechanism will operate.

The control-reversing mechanism provided for conditioning the system for automatic control of engine-speed within the braking range may be broadly referred to by the numeral 228. It comprises two solenoid-operated double-pole double-throw switches 230 and 232. Switch 230 has four contact posts 234, 236, 238, and 240 diagonally connected as shown. Switch 232 has four contact posts 242, 244, 246 and 248 similarly connected. Switch 230 has two contact bars 250 and 252 supported on a yoke 254 of insulation, to the rear end of which a ferrous solenoid core 256 is secured in position to be acted upon by the solenoid coil 258. Switch 232 has contact bars 260 and 262, fast on the yoke 264, with core 266 and coil 268. Spring 270 holds the bars 250 and 252 in electrical contact with the posts 238 and 240, respectively, except when the coil 258 acts on the core 256, in which case the bars 250 and 252 are electromagnetically held in contact with the posts 234 and 236. Similarly, the spring 272 holds the bars 260 and 262 in electrical contact with the posts 246 and 248, respectively, except when the coil 268 acts on the core 266, in which case the bars 260 and 262 are electromagnetically held in contact with the posts 242 and 244.

Posts 234, 236, 242 and 244, respectively, transmit current through suitable conductors to the coils of the solenoid operated switches 274, 276, 278 and 280, whereby the field coils 114, 116, 110 and 112 of the servomotors 90 and 88 are energized. The contact bars 250, 252, 260, and 262 are connected to a source of electrical energy by the closing of the governor operated switches 208, 204, 210 and 206, respectively. Obviously, a given one of the governor controlled switches 204, 206, 208 or 210 will direct current to the servomotors for one direction of rotation before the solenoid coils 258 and 268 become active, and for the other direction of rotation, after they become active. The solenoid coils 258 and 268 are energized through a cam operated switch, the cam of which is advanced or retarded with respect to blade pitch as a function of the air speed of the craft, whereby the dividing line between the flight-pitch-range and the braking-pitch-range shifts away from the 0 pitch-angle according to the air speed of the craft.

A duplex double-pole double-throw switch arrangement corresponding in a measure with the reversing mechanism 228, above described, is shown and described in my copending application, Serial No. 465,970, filed November 18, 1942, now Patent No. 2,378,938, dated June 26, 1945. The structure of the copending application, however, is such that the sense of the governor with respect to direction of rotation of the servomotors changes when the blade angle reaches zero pitch, regardless of the speed of the aircraft.

As a convenient means for operating the electric switches which control the reversing mechanism 228, certain signal lights which indicate whether the propeller blades are in the positive or negative pitch range, and other switches which stop pitch increase or decrease at a predetermined pitch angle, the cam shaft 282 is provided and so connected to the pitch-change gear-set through a differential gear-set 284, that the degrees of rotation of the shaft 282 is a function of the degrees of rotation of the propeller blades 22 or 18 on their axes while changing pitch.

The differential gear-set 284 includes a gear 286 rotatably supported in the housing 62 and drivably connected to the external teeth of the ring gear 68 by an idler pinion 288. A second gear 290, also rotatable in housing 62, is drivably connected to the external teeth of the ring gear 70 by two pinions 292 and 294, whereby the gears 286 and 290 rotate in the same direction when the ring gears 68 and 70 are rotating oppositely.

A bevel gear 296 is fast on the gear 286 and a second bevel gear 298 is fast on the gear 290. Bevel pinions 300 are supported for rotation on their radial axes, and for revolution around the axis of the bevel gears 296 and 298 by the carrier 302, which is directly connected to the shaft 304, which is, in turn, connected to the cam shaft 282 through gears 306, 308, 310 and 312. For convenience in illustration, the gearing which connects the blade 22 to the cam shaft 282, may preferably be so proportioned that when the blade 22 rotates on its axis through, say ninety degrees, the came shaft 282 will rotate through one hundred eighty degrees. Also, when the blade 22 rotates in the direction of the arrow 28 or 30 for pitch increase, the cam shaft 282 will rotate anticlockwise, when viewed from the right of the drawing.

It is here noted that rotation of the propeller itself about the axis of the propeller hubs 10 and 14, does not in any degree affect rotation of the cam shaft 282. The cam shaft 282 will be nonrotative, with or without propeller rotation, except when pitch change is taking place. Then it will be rotated in a given direction by rotation, in one direction, of the ring gear 68, by rotation, in the opposite direction, of the ring gear 70, or by both ring gears together, when one rotates oppositely of the other.

Fastened to the shaft 282, for unitary rotation therewith, is a pitch-indicating pointer 314 associated with a stationary pitch-indicating dial 316. Dial 316 is graduated to show at all times the exact pitch angle to which the blades 18 and 22 have been turned. It is noted that, since the ratio of degrees rotation of blades 22, to degrees rotation of cam shaft 282 is one to two, the dial 316 spans a distance of one hundred eighty degrees between the graduations for the 0° and 90° blade pitch. All cams carried on the shaft 282 are, of course, cut to the same ratio.

Fast also on the shaft 282 is the feathering cam 318. In the drawing it will be seen that the blade 22 is shown as having been turned to plus 20 degrees, which has, for illustration, been taken as midway in the low-speed flight range. Since the blade 22 must be turned an additional 70 degrees, i. e., turned to an angle of plus 90 degrees, for full feathering, the feathering cam 318 must turn in the same time through 70×2=140 degrees of rotation. The cam lobe 320 is therefore so positioned on the cam 318 that anticlockwise rotation through 140 degrees will bring the lobe to the top center, where it will have opened the switch 322 and coincidentally closed the switch 324. Opening of the switch 322 breaks the current which has been operating the high-rate servomotor for pitch increase and thus stops pitch change at the full feathering position, while closing of the switch 324 lights a white signal lamp 326 on the instrument panel, indicating that the propeller is fully feathered. An additional switch 325 is opened by the cam 318 coincidentally with the opening of the switch 322. Switch 325, when opened, breaks the circuit through the lowrate servomotor 90 when it is being operated by the switch 85 for making fine adjustments of pitch-change manually. It is here noted that anticlockwise rotation of the shaft 282, i. e., in the direction of the arrow 327 on the feathering cam 318, always results from an increase in the positive pitch angle of the propeller blades, i. e., rotation of the blades in the direction of the arrow 28 or 30.

The pitch-indicating pointer 314 and the feathering cam 318, being fast on the shaft 282, which is gear-connected to the blades 22, always rotate as a direct function of pitch-change, regardless of the velocity at which the craft is moving with respect to the ambient air. Seven additional cams, however, are provided for performing other functions which are initially controlled by pitch change, but are subject to correction for changes in air speed. The seven additional cams are therefore made fast on a tube 328, within which the shaft 282 rotates freely. An air-speed-responsive device is then provided which includes gearing whereby, when a change in pitch rotates the shaft 282 in one direction, the tube 328 is turned by the gearing an equal amount in the opposite direction provided the change in pitch is not accompanied by a corresponding change in air speed. Thus a positive pitch increase of the blades 22 will, when no change in air speed is taking place, rotate the shaft 282 in the direction of the arrow 327 which will rotate the tube 328 an equal amount in the direction of the arrow 329.

But the rotative displacement of the tube 328 is equal to the rotative displacement of the shaft 282 only so long as no change in air speed is taking place. The air-speed-responsive device, however, contains other mechanism which is brought into play when automatic governing is initiated, and which subtracts from the rotative displacement of the tube, relative to that of the shaft, as a function of air speed.

The air-speed-responsive mechanism is so designed that a change in blade pitch, without corresponding change in air speed, rotates the tube 328 equally but oppositely of the shaft 282, but a change in blade-pitch with corresponding change in air speed, subtracts contrarotation from the tube in such amount as to make the tube nonrotative with respect to the switches which its cams are to operate, while the shaft 282 rotates strictly in proportion to the change in pitch.

The air-speed-responsive mechanism provided for determining the degree of rotatable displacement of the tube 328 with respect to the shaft 282 is shown in considerable detail in the schematic view, Fig. 3, and may be broadly designated by the numeral 330. It comprises a housing 332 which encloses a bellows 334 operatively connected to a rod 336 which is vertically operable, by change in pressure in the bellows, against the resistance of a spring 338. Spring 338 is adjustable by a screw 340. A gear segment 342 is pivoted in the housing 332 at 344. A slot 346 through the gear segment receives a pin 348 which extends laterally from the rod 336, whereby the gear segment is oscillated by movement of the rod. Gear teeth 350 on the segment 342 are in mesh with the teeth of a pinion 352 which is rotatable on a stud 354 extending laterally from the wall of the housing 332. A bevel gear 356 is secured to the pinion 352 for unitary rotation therewith. A bevel pinion 358 is in mesh with the bevel gear 356. Pinion 358 is fast on a shaft 360 whereby expansion of the bellows 334 causes anticlockwise rotation of the shaft 360. A Pitot tube 362 has its pressure opening connected by a pipe 364 to the inside of a bellows 334, and its connection to the ambient air made by a pipe 366 to the interior of the housing 332. A frame 368 also provides bearing for the shaft 360, and an integral screw 370 is carried on the shaft within the frame. A relatively narrow pinion 372 is internally threaded to fit the screw 370 and is held between the cheeks of a carriage 374. Assuming, for descriptive purposes, that the screw 370 is right hand, anticlockwise rotation of the shaft 360 will move the pinion 372 toward the left until it closes the switch 376, whereupon the battery 378, assuming the manual switch 379 is closed, will be connected to supply current through the field coil 380 of the motor 382, thereby to rotate the elongated pinion 384 clockwise. Rotation of the elongated pinion 384 clockwise will turn the narrow pinion 372 anticlockwise, thereby returning it to the central position shown. The rotation of the elongated pinion 384, and the narrow pinion 372 which is connected thereto in a clockwise direction, will have rotated the gear 386 in an anticlockwise direction. Gear 386 is fast on a housing 388 within which the bevel gear 390, which is fast on the shaft 282, and the bevel gear 392, which is fast on the tube 328, are enclosed. Bevel pinions 394 have radial bearings in the housing 388 and are in mesh with both the bevel gears 390 and 392, whereby anticlockwise rotation of the housing 388 will rotate the tube 328 in an anticlockwise direction with respect to the shaft 282. The housing 388 and its gears 390, 392, and 394 may be referred to as the air speed differential gear-set 391.

On the other hand, if the pressure in the bellows 334 is reduced by a reduction in air speed, the spring 338 will move the rod 336 upwardly, thereby rotating the shaft 360 clockwise, which will move the narrow pinion 372 to the right to close the switch 396, which will in turn connect the battery 378 through the coil 398 to rotate the elongated pinion 384 in an anticlockwise direction, whereby the gear 386, through the differential 392—394, will rotate the tube 328 in a clockwise direction with respect to the shaft 282, and thereby restore the original relation between the shaft and tube.

A spring-engaged-solenoid-disengaged brake 400 of substantially the same design as used in the servomotors and follow-up motor hereinbefore described, is disengaged by the coil 402 coincidentally with the energization of either of the field coils 380 or 398, whereby the elongated pinion 384, pinion 385, gear 386, and housing 388 are all held locked against rotation as long as no change in air speed is taking place. It should be kept in mind, however, that the fact that the housing 388 is locked because no change in air speed is taking place, does not prevent the governor 118 effecting any necessary changes in blade-angle by way of the servomotors 88 and 90 through the pitch-change gear-set 65, for, in that case, if the cam shaft 282 rotated, for instance, anticlockwise for pitch increase, as before explained, the tube 328 would turn clockwise an equal degree through the differential gears 390, 394, 392. It will be understood, therefore, that when no change in air speed is taking place, an increase in blade-pitch, as for instance, an increase from 0 pitch, will rotate the cam shaft 282 anticlockwise, from the 0 indication, twice the number of degrees as the change in blade-angle, and the tube 328 clockwise, twice the number of degrees as the change in blade-angle, while if, when pitch increase is thus being effected, there is the expected corresponding increase in air speed, from 0 air speed, the tube will remain nonrotative. This condition is had by so proportioning the air-speed-responsive device 330 that, when the shaft 282 is rotatably displaced in response to a change in pitch, and the air speed coincidentally changes in correspondence with the change in pitch, this change in air speed should rotatably displace the housing 388 in the same direction as the shaft 282, but through only half the rotative displacement as the shaft. It is well known that where one of the gears of a differential is held nonrotative while the other rotates, the pinion carrier rotates half as fast as the rotating gear.

It will be apparent to one familiar with propeller art that the air-speed-responsive mechanism described corrects the pitch-limit stops as a function of the indicated air speed or dynamic pressure. For extreme accuracy a mechanism may be provided which will correct as a function of true air speed. Any type of true air speed indicator could be connected somewhat in the manner shown to effect more accurate corrections.

The Reversing cam 404 is fast on the left end of the cam shaft tube 328. It is provided for closing a switch 406 which makes connection to the battery 378 when the main switch 407 is closed, which energizes the coils 258 and 268 of the reversing mechanism 228 when it is desired to govern automatically in the negative pitch-range, as previously described. The angle at which the mean plane of the blade 22 is shown in the drawing is plus 20 degrees. If the blade were moved to a position of minus 25 degrees or through a total angle of 45 degrees, it would be on the line 95 which is at the midpoint of the negative or braking range, and, if there was coincidentally no change in air speed, the cam 404 would have moved anticlockwise through 90 degrees, so that the operating lug 408 would be midway in the notch 410. The cam 404 as well as the other cams on the tube 328, are shown as they will appear at 0 air speed, when the blade 22 is as shown, at plus 20 degrees, which places the shaft 282 at 40 degrees anticlockwise, and the tube 328 at 40 degrees clockwise from their zero pitch position.

The Positive signal-cam 412 is provided for closing a switch 414, which makes connection to the battery 378 through the main switch 407, the auxiliary switch 415, and the switch 117, which is operated by the Automatic push button 109. This connection is made when the lug 411 drops into the notch 413, and is provided for lighting a green signal light 416, which indicates, when automatic operation in the positive pitch range is initiated, that the blade-pitch is in correspondence with the air speed.

The Negative signal-cam 418 is substantially a duplicate of the cam 412, but is set 90 degrees farther around and is used to close a switch 420, which also makes connection to the battery 378, through the main switch 407, auxiliary switch 415, and the push button switch 117, which is operated by the Automatic push button 109. This connection is made for lighting a red signal light 422, which indicates, when automatic operation is initiated, that the blade pitch is in correspondence with the air speed. Turning of the blade 22 through 45 degrees will rotate the cam 418 through 90 degrees and place the notch 424 symmetrically over the operating lug 426.

The Unbrake cam 428 comes into action when, preparatory to initiating automatic operation in the positive pitch range, the blade-pitch is being brought to the line 93 at the mid point of the positive or flight range from any lesser positive pitch, or from the negative pitch range. The Unbrake push button 105, when depressed, closes the switch 113, which makes connection from the battery 378, through main switch 407 and switch 430, to operate the solenoid which closes the switch 278 and energizes the pitch-increase coil 110 of the high-rate servomotor 88, whereby the pitch is increased until the line 93 at the mid point of the flight range is reached, at which point the cam raises the operating lug 432 to open the switch 430, and arrests pitch-change at this point. The raising of the operating lug 432 coincidentally closes a switch 434, which lights a green signal light 436. This position of the cam is shown in the drawing.

The Brake cam 438 comes into action when, preparatory to initiating automatic operation, the blade-pitch is being brought to the line 95 at the mid point of the negative or braking-range from any lesser negative pitch or from the positive pitch-range. The Brake push button 103, when depressed, closes the push button switch 111 which makes connection from the battery 378 through main switch 407, and switch 440, to operate the solenoid which closes the switch 280 and energizes the pitch decrease coil 112 of the high rate servomotor 88, whereby the pitch is decreased until the line 95 at the mid point of the braking-range is reached, at which point the cam raises the operating lug 442 to open the switch 440 and arrest pitch-range at this point. The raising of the operating lug 442 coincidentally closes a switch 444, which lights a red signal light 446 and opens a switch 447 which prevents pitch-change by the manual switch 85 beyond a safe position in the braking range.

The Automatic pitch-limit-decrease stop cam 448 is provided for opening both the high and the low rate pitch-change limit-switches 450 and 452. The cam 448 has two active lobes 454 and 456. The first lobe 454 is so placed that, if the blade 22 moves in a pitch-decreasing direction as much as 5 degrees from its 20 degree position; that is, from the line 93, which is the midway position of the low speed flight range, and there is coincidentally no correction of the cam position by a corresponding change in air speed, the lobe 454 will raise the lug 458 and open the switches 450 and 452, whereby the governor 118 is momentarily prevented from employing the servomotors 88 and 90 to further decrease the positive pitch. The other lobe 456 is so placed that, if the blade 22 is turned 45 degrees from the position shown, or to the line 95 at the mid point of the low-speed braking-range, and the blade then moves back in a direction which decreases the negative pitch as much as 5 degrees from the line 95, its 45 degree negative position, the lobe 456 will raise the lug 458 and open the switches 450 and 452, whereby the governor 118 is momentarily prevented from employing the servomotors 88 and 90 to further decrease the negative pitch. It will be noted that anticlockwise rotation of cam 448 results from pitch decrease in the positive range, while clockwise rotation of cam 448 results from pitch decrease in the negative range.

The Automatic pitch-limit-increase stop cam 460 is provided for opening both the high and the low-rate pitch-change limit-switches 462 and 464. The cam 460 has two active lobes 466 and 468. The first lobe 466 is so placed that, if the blade 22 moves in a pitch-increasing direction as much as 5 degrees from the line 93, its 20 degree position, which is the midway position of the low-speed flight-range, the lobe 466 will raise the lug 470 and open the switches 462 and 464, whereby the governor 118 is momentarily prevented from employing the servomotors 88 and 90 to further increase the pitch. The other lobe 468 is so placed that, if the blade 22 is turned 45 degrees, or to the line 95, the mid point of the low-speed braking-range, and the blade moves further in a direction which algebraically decreases the negative pitch as much as 5 degrees from the line 95, its 25 degree negative position, and there is simultaneously no correction of cam position by a corresponding change in air speed, the lobe 468 will raise the lug 470 and open the switches 462 and 464, whereby the governor 118 is momentarily prevented from employing the servomotors 88 and 90 to further increase the negative pitch.

Again noting that the feathering switch 115 and the unbraking switch 113 always operate to algebraically increase pitch, i. e., increase it if it is in the positive range, but decrease it if it is in the negative range while the braking switch 111 always operates to algebraically decrease pitch, i. e., decrease it if it is in the positive range but increase it if it is in the negative range, the operation of the system hereinbefore described and disclosed in Figs. 1 and 3 is as follows.

Assume that the engine has not yet been started. The main switch 407 should be closed, thus completing connection from the battery 378 to the Brake, Unbrake and Feather push button switches 111, 113, and 115, and to the solenoids and switches 274, 276, 278 and 280, which control the servomotors. Pitch change may now be effected manually by pushing either of the buttons 103, 105 or 107.

The propeller may have been left in the braking range at a previous landing. If such is the case, it may be brought to a position in the positive range which is suitable for starting the engine, by depressing the Unbrake button 105, which will complete a circuit through the cam operated switch 430, which is at this time closed, to the pitch-increasing field coil 110 of the high-rate servomotor 88. When the blade pitch passes the zero line 91, which may be observed on the pitch indicator dial 316, the Unbrake button may be released and the manual low-rate switch 85 employed instead to more closely adjust the pitch to an appropriate positive pitch angle suitable for starting. The engine may now be started in the usual way, and, after it is started, the Unbrake push button may again be used to bring the pitch to the plus 20 degree angle shown. Upon reaching that pitch-angle, the Unbrake cam 428 opens the switch 430 to arrest pitch-change, and closes the switch 434 to light the green signal light 436 to indicate that the mid-point of the low-speed flight-range has been reached. The pilot will then preferably release the Unbrake button and press down the button 109 for automatic governing in take-off. The blade will now automatically assume an angle commensurate with the throttle setting for take-off which is governed by the experience of the pilot. It is noted that when the push button 109 is released to stop automatic operation, the constant speed motor 120 and the electromagnetic clutches 136 and 156 are disconnected from the battery, whereupon the brakes 144 and 164 are spring applied. Thus the entire governing mechanism rests except when automatic operation is initiated.

On the other hand, the propeller may have been left in the feathered position at the last landing. In that case, the pilot may press the Brake push button 103, which completes a circuit through the now closed cam operated switch 440, to the pitch-decreasing field coil 112 of the high rate servomotor 88. When the pitch is near a suitable starting angle, which may be determined by observing the pitch indicator dial 316, the manual switch 85 may be used to complete a fine adjustment of the pitch and the engine may then be started in the usual way. After starting, the Unbrake push button may be held down until the Unbrake cam 428 opens the switch 430, which arrests pitch-change at plus 20 degrees, the mid point of the low-speed flight-range, and lights the green light 436. The automatic push button 109 may now be pressed down and anchored for automatic governing in take-off and subsequently in flight.

In still another case the propeller may have been feathered and necessary repairs made to the engine during flight, and the engine is again to be started. In this case, it may be preferable to close the manual switch 85 until the pitch has moved just slightly off the feathered position, and the engine may be windmilled at a speed sufficient for starting, and thereafter, when the engine is running, the Brake push button may be further employed to bring the pitch to the mid point of the flight-range, which point may be observed on the pitch indicator dial 316. The mid point, however, may be on the line 93 if the craft is moving at low speed, or it may be anywhere between the line 93 and the line 97 if the craft is operating at a higher speed. In any event the manual switch 85 may be used to complete a fine adjustment if so desired before initiating automatic operation.

When either of the above circumstances are being taken care of as indicated, the auxiliary switch 415 should be closed coincidentally with the starting of the engine, so as to energize the master motor 120, the selected speed of which fixes the speed of the engine.

Simultaneously also with the starting of the engine and the master motor 120, the Automatic push button 109 should be pushed down fully so it will be held down by the hook 123. This will close the push button switch 117 for energizing the coils 154 and 134 of the clutches 156 and 136, whereby the governor 118 is made to connect the master motor 120 and the engine shaft 126 to maintain synchronism therebetween.

Closing of the switch 117 also completes electrical connection to the cam-operated switch 414, which keeps a green signal lamp 416 burning as long as the propeller is operating at any positive pitch-angle which is not more than 5 degrees greater or less than the correct pitch-angle for the then existing air speed.

Closing of the switch 117 also completes electrical connection to the cam operated switch 420, which will, whenever the blade is turned to the negative pitch-range, keep a red signal lamp 422 burning as long as the propeller is operating at any negative pitch-angle which is not more than 5 degrees greater or less than the correct pitch-angle for the then existing air speed.

Depressing the Automatic push button 109 also closes the switch 119, whereby connection is made to the common terminals of the governor-operated pitch-increasing switches 204 and 206, and the governor-operated pitch-decreasing switches 208 and 210, which, when they close, complete connections to the servomotors 88 and 90, and the follow-up motors 212. The governor 118, when thus connected, will maintain the speed of the engine at the speed at which the master motor 120 is set, in the manner previously described, as long as normal flight continues.

Should it become desirable to employ propeller braking, either for landing or for dive braking, the Brake push button will be depressed. This will first move the plate 131 to the left and release the hook 123 of the Automatic push button 109. The Brake push button will then be held down until the red light 446 burns and until the blade 22 has turned through, say 45 degrees; that is, from a positive pitch position, which may be somewhere between the lines 93 and 97, to the negative pitch position, which may be somewhere between the lines 95 and 99, depending on the then existing air speed. This will cause the cam shaft 282 to rotate 90 degrees clockwise, which, in turn, will cause the brake cam 438 to rotate 90 degrees anticlockwise; that is, from the position shown to the position necessary for opening the switch 468, provided, of course, there is, in the interim, no substantial change in air speed.

When the cam 404, which coincidentally turns 90 degrees anticlockwise, had turned through 40 degrees of this angle, at which angle the propeller was at the point of 0 thrust, the switch 406 closed and operated the reversing mechanism 228, which changed the sense of the governor 118 preparatory to employing it for governing in reverse pitch. The mechanism will now be in the reverse pitch-range, and, having changed the governor sense with respect to the servomotors, is ready to be connected for automatic governing in reverse pitch. The Automatic push button 109 may therefore now be pushed down, and the governor 118 will maintain a uniform engine speed in reverse pitch while braking is being effected.

It may be noted that, as long as the blade pitch is being properly controlled by the governor 118, and the air speed of the craft is in substantial response to the changes in blade pitch, the air-speed-responsive device 330 will maintain the tube 328 and its cams in substantially the position shown in the drawing, for all positive thrust flight speeds, but will hold the cams substantially stable in a position 90° anticlockwise from the position shown in the drawing, for all speeds at which automatic braking may be effected.

If the above-described braking operation has been made in free forward or diving flight, it may be desirable, after any desired period of propeller braking, to return to automatic governing in the positive thrust flight-range. This will be accomplished by pressing the Unbrake push button 105 which first releases the Automatic button 109. The Unbrake button then will be held down until the green light 436 burns and the blade pitch changes from its negative pitch, which will be somewhere between the lines 95 and 99, to its positive pitch, which will be somewhere between the lines 93 and 97, depending on the air speed, the cams meanwhile having rotated 90 degrees clockwise to their flight position. The Automatic button will now be depressed for a return to governing in the positive thrust flight-range, it being noted that, as the reversing cam 404 moves its notch 410 away from the lug 408, the reversing mechanism 228 is reset to change the sense of the governor 118 back to the condition for automatic governing in the positive thrust flight-range.

The automatic governing of the system may be summarized as follows: If the engine goes off the speed of the master motor, the governor 118 operates the proper servomotor to so change the pitch as to bring the engine back to speed, the follow-up motor 212 operating simultaneously to return the governor element 188 to the neutral position. The pitch indicator shaft 282 will have rotated in direct proportion to the change in pitch.

The cam tube 328, through the differential 391, would, without the air speed correction, have rotated an equal amount in a direction contra to that in which the cam shaft 282 rotated. The air speed, however, should have by now changed as a function of the change in pitch, so the air-speed-responsive means 330 has by now wiped out the contrarotation of the tube, and thus let it remain relatively nonrotative with respect to the switches which it is intended to operate.

Thus the greater the change in blade-pitch, the greater the rotative displacement of pitch indicator shaft 282, and the more contrarotation of the tube 328 there is to be corrected by increase in air speed. As long, therefore, as air speed and blade-pitch are commensurate, the cams 460, 448, etc., do not rotate, and therefore do not operate their respective switches, except, of course, as was hereinbefore described, when a large pitch-change of as much as 45 degrees was made in as little as one second time, in changing from flight to brake, or vice versa, provided there is no substantial change in air speed, and consequently, no air speed correction, and the cam tube 328, therefore, rotates in one direction as much as the cam shaft 282 rotates in the other direction.

The lobes on the Automatic increase and decrease cams 460 and 448 are so positioned that 5 degrees rotation from the positions shown, indicating that the air speed is the equivalent of 5 degrees out of correspondence with the pitch-angle, will stop further change in pitch-angle until the air speed can adjust itself to the pitch. Therefore, any malfunctioning of the governor, which would change the pitch faster than the air speed could adjust itself to the change, or which would fail to change the pitch as fast as the air speed was changing, would bring the lobes of the cams 460 and 448 around to where they would arrest pitch-change until air-speed-change caught up with it.

With perfect functioning of the mechanism as a whole, the pitch-change-arresting cams do not move from the position shown, whether the air speed is minimum or maximum, for while at maximum air speed, the pitch indicator shaft will have turned farther, the greater air speed will have cancelled the correspondingly greater contrarotation of the cam tube.

In the hydraulic exemplification shown in Fig. 2, the dual rotation hubs 10 and 14, and the dual rotation gear-set 26 which transfers pitch-change from one hub to the other, are identical with corresponding parts of Fig. 1, and will, therefore, not be further described. For convenience in considering Fig. 2, however, the several numerals which designate the various parts of the gear-set are included in the drawing.

The pitch-change gear-set, however, which may, as a whole, be identified by the numeral 67, differs somewhat from the gear-set 65, shown in Fig. 1. Gear-set 67 is contained in a housing 61 which is carried on the nose 63 of the engine. It includes a pair of ring gears 68 and 69, gear 68 being freely rotatable, and gear 69 being fixed against rotation, in the housing.

Two connected sun gears 72 and 74 are freely rotatable in the inner sleeve of the hub 14. Planet pinions 76 and 78 are in mesh with the internal teeth of the ring gears 68 and 69 and the external teeth of the sun gears 72 and 74, respectively. Carriers 80 and 83, respectively, support the pinions 76 and 78 for rotation on their axes, and for revolution about the sun gears 72 and 74, and within the ring gears 68 and 69.

Carriers 80 and 83 are both concentrically supported on the inner sleeve of the rear hub 14, the carrier 83 being fast on the sleeve for unitary rotation therewith, while the carrier 80 is freely rotatable thereon. An external gear 84 is secured to the carrier 80 to rotate therewith, and meshes with the pinion 86 which is fast on the shaft of the worm 24. An externally toothed pump-driving gear 87 is concentrically secured to the periphery of the carrier 83. In a pitch-change gear-set, such as is shown at 67, where one of the ring gears is permanently held nonrotative, pitch increase or decrease is effected by rotation, in one or the other direction, of the rotatable ring gear. If, additionally, a high rate and a low rate of pitch-change is desired, both conditions may be satisfied by having a single servomotor which selectively rotates the rotatable ring gear forward or backward at a high speed, or forward or backward at a low speed. Any fluid motor of the type in which a reversal of fluid flow through the motor will reverse the direction of rotation, is adaptable to the gear-set 67.

But while a single servomotor 89 may suffice, a better balance may be obtained by circumferentially and preferably equally spacing three or more similar motors of smaller capacity on the housing 61, each having a pinion 91 in mesh with the external teeth of the rotatable ring gear 68, the three motors then acting as one. In Fig. 2, the three motors are shown in an exploded view for convenience in showing the hydraulic connections, one motor only being shown as having its pinion 91 meshed with the ring gear 68. The true arrangement, however, is as shown in Fig. 4, the motor pinions 91 being there shown circumferentially spaced around the ring gear 68.

While the three hydraulic motors 89 operate simultaneously, their operation is intermittent, so that the one pump 135, having a pinion 137 in mesh with the pump-driving gear 87, is sufficient to supply the motive power for the motors. Since gear 87 is fast on the carrier 83, which is fast on the inner sleeve of the hub 14, the pump 135 rotates always in the same direction, and always as a function of hub rotation, whereas the hydraulic motors 89 rotate in opposite directions and only when pitch change is required to be effected.

The suction side 139 of the pump 135 is pipe connected to a fluid supply tank 141, while its discharge side 143 is pipe connected through a strainer 145 and through a one-way valve 147 to an accumulator 149. A spring loaded pressure relief valve 151 connects the discharge and suction lines, and thereby controls the pressure in the accumulator. Pipe connection is made from the accumulator, through a one-way valve 153, then through a solenoid operated valve 155 which controls the volume of the flow to the servomotors, and thus controls their speed of rotation, then through a solenoid operated valve 157, which controls the direction of flow through the servomotors and thereby determines the direction of their rotation either for pitch increase or for pitch decrease.

Inasmuch as speed change is taking place for a relatively small part of the whole time in which the pump 135 operates, the pump is compelled to pump through the relief valve 151 for the greater portion of the time. Since the relief valve is set at the desired accumulator pressure, it follows that the pump is operating against the full accumulator pressure at all times.

In view of the above facts, it may be preferable to employ an unloading valve 259, Fig. 5, of standard construction, whereby, when the desired accumulator pressure has been reached, connection to the accumulator is severed, and the pump returns surplus fluid to the tank 141 against substantially zero back pressure.

The speed control valve 155 comprises a body 159, bored to slidably receive a piston 161, which is provided with a small transverse passage 163, through which fluid flows to the servomotors at a low rate when a low rate of pitch change is desired. When either of the solenoid coils 165 is energized, it lifts the piston up in the body, which permits unrestricted fluid flow to the servomotors when a high rate of pitch-change is desired. A spring 167 holds the piston in the low rate position except when one of the solenoid coils is energized.

The direction-control valve 157 comprises a body 169 containing two slidably fitted spaced-apart pistons 171 and 173 which are fast on a piston rod 175, the outer ends of which serve as cores for the solenoid coils 177 and 179. A conduit 181 connects the outlet side of the speed control valve 155 to the space between the pistons 171 and 173, while two manifolds 183 and 185, respectively, convey the hydraulic fluid from the valve 157 to the rear sides 187 and the front sides 189 of the servomotors. A return manifold 191 connects the spaces above and below the pistons 171 and 173 to the tank 141. Springs 193 normally hold the pistons 171 and 173 over the outlets to manifolds 183 and 185. When the solenoid coil 177 is energized, the piston rod 175 and the pistons move upward, whereby the supply conduit 181 is connected to the manifold 183, while the manifold 185 is connected to the return manifold 191, which arrangement will direct fluid through the servomotors from the rear 187 to the front 189.

When the solenoid coil 179 is energized, the piston rod 175 and the pistons move downward, whereby the supply conduit 181 is connected to the manifold 185, while the manifold 183 is connected to the return manifold 191, which arrangement will direct fluid through the servomotors from the front 189 to the rear 187. Pitch increase or decrease is thus effected by energizing one or the other of the solenoid coils 177 or 179. Whether it is effected at a high or at a low rate depends on whether or not a solenoid coil 165 of the speed control valve 155 is energized.

A hand pump 195 is provided for pumping through a one-way valve 197 into the accumulator for emergency operation of the servomotors when the pressure in the accumulator fails, the direction control valve 157, in that case, being operated up or down by that one of the push buttons 103, 105 or 107 which represents the desired pitch-change. Failure of the accumulator pressure will seldom occur except when the craft has stood idle for too long a period of time or when the rotary pump 135 fails. A relief valve 233 is provided for returning excess fluid to the tank 141 when the accumulator has reached the required pressure from hand operation of the pump 195.

A pressure cutout switch 199 is responsive to a failure in pressure in the accumulator 149 to sever the solenoid coils 177 and 179 from their ground connections. The structure and function of the switch 199 will be later described.

As a means of locking the ring gear 68 against creeping when no pitch-change is desired, a clutch mechanism 201 is provided. Locking-clutch 201 consists of a stud 203 which is nonrotatably supported in the housing 61 with its axis parallel to the axes of the servomotors 89, and in the space intermediate two of the servomotors. The portion of the stud 203 adjacent its support has external splines 205 over which the internal splines of a jaw clutch member 207 are slidably fitted, while the outer end of the stud is smooth, and provides a bearing upon which a pinion 209 may rotate freely. The interfacing surfaces of the pinion 209 and clutch member 207 are serrated, so that when a spring 211 presses the serrations together, as shown, the pinion 209 is locked against rotation. Since the pinion 209 is in mesh with the ring gear 68, the ring gear is normally held nonrotative and no change in pitch may be effected. A solenoid coil 213 is provided for withdrawing the clutch member 207 axially, thereby separating the serrations between the clutch and the pinions so that the pinion may rotate freely. The clutch-operating solenoid coil 213 is electrically energized through a switch 231, which is closed upon energization of either of the solenoid coils 233 or 235, which occurs coincidentally with energization of either valve-operating solenoid coil 177 or 179, which control rotation of the servomotors, whereby, whenever a servomotor is connected for rotation through the direction control valve 157, the pinion 209 is simultaneously released, so that the motor, and the pitch-change ring gear 68, into which the pinion meshes, may rotate and pitch-change be thereby effected.

The pressure actuated electric switch 199, which is associated with the accumulator 149, is arranged to sever the ground connection of the solenoid coils 227 and 229 concurrently with the breaking of the ground connection of the coils 177 and 179, as hereinbefore mentioned.

Pressure switch 199 consists of a casing 235 with a small cylinder 237 in the bottom, to which a piston 239 is slidably fitted. A conductive bar 241 is insulatedly supported on the top of the piston, and springs 243, insulatedly secured to the bar, are provided for pulling the bar downward. The space under the piston is pipe-connected to the accumulator 149, whereby, whenever the fluid pressure is at the desired value in the accumulator, the springs 243 will be overcome, and the common terminal 245 of the coils 177 and 179, and the common terminal 247 of the coils 233 and 229, are connected by the bar 241 to the ground terminal 249. Failure of the predetermined pressure in the accumulator 149, therefore, prevents opening of either passage through the direction-control valve 157, and prevents unlocking of the pitch-locking clutch 201.

For energizing the several solenoids which control the mechanism which operates the servomotors 89 for pitch-change, a push button control set 101 is provided, but since this set is exactly like that shown in Fig. 1 under the same reference numeral, no further description will be given, although for convenience in considering Fig. 2, the numerals of the individual parts are applied thereto in the drawing.

The automatic pitch-change governing mechanism of Fig. 1, which includes the follow-up motor 212 and the differential gear-set 199, is also used in the modification Fig. 2 for sensing overspeed or underspeed engine conditions and their magnitude, and selectively energizing the solenoid coils which control the servomotors for effectuating appropriate pitch-change. A slight addition to the governor of Fig. 1 appears in the governor shown in Fig. 2. This addition consists of a switch 261 closable by a solenoid 263 for completing the ground connection of the follow-up motor 212, whereby the follow-up motor may operate only when the switch 119 is closed by the push button 109 for automatic operation. No further changes have been made and no further description of the construction is therefore given, although the reference numerals applied to the detail parts of the governor in Fig. 1 are repeated in the modified system of Fig. 2.

The wiring of the system of Fig. 2, however, differs from that of Fig. 1 in that the governor-actuated switches 204, 206, 208 and 210, of Fig. 2, operate to energize solenoid coils which operate valves which control the speed and direction of rotation of hydraulic servomotors, while in the system of Fig. 1, the same governor-actuated switches operate to directly energize the coils of electric servomotors which effectuate pitch-change.

The electrical connections of Fig. 2 are such that, coincidentally with the closing of the governor-operated switch 204 by the carriage 188, due to overspeeding of the engine shaft 126, the pitch-increasing solenoid coil 179 is energized, whereby the piston rod 175 moves downward, thereby opening a passageway from the accumulator 149 through the valve 155, conduit 181, manifold 185, through the servomotors from 189 to 187, through the manifold 183, and back through the manifold 191 to the tank 141. This rotates the servomotors 89 clockwise, i. e., in the direction of the arrow 215, which is the proper direction for pitch-increase. Since neither solenoid coil 165 of the speed control valve 155 is energized upon closing of the governor switch 204, the pitch-increase will be at a low rate. The follow-up motor 212, as explained with reference to Fig. 1, will return the carriage 188 to the neutral position shown after the proper R. P. M. correction has been made.

Closing of the governor operated switch 208 by the carriage 188, due to underspeeding of the engine shaft 126, energizes the pitch decreasing solenoid coil 177, whereby the piston rod 175 moves upward, thereby opening a passageway from the accumulator 149 through the valve 155, conduit 181, manifold 183, through the servomotors from 187 to 189, through the manifold 185 and back through the manifold 191 to the tank 141. This rotates the servomotors 89 anticlockwise, i. e., in the direction opposite to the arrow 215, which is the proper direction for pitch-decrease. Since neither solenoid coil 165 is energized upon closing of the governor switch 208, the pitch decrease will be at a low rate. The follow-up motor will return the carriage 188 to the neutral position.

When the magnitude of the off-speed condition is great enough to cause the carriage 188 to move to the right far enough to close the switch 206 in addition to the switch 204, or to the left far enough to close the switch 210 in addition to the switch 208, a solenoid coil 165 of the speed control valve 155 will be energized, and the piston 161 will be raised against the resistance of the spring 167 until the piston clears the passageway through the conduit 181 for a high rate of fluid flow, and, therefore, for a high rate of pitch-increase or decrease.

The control-reversing mechanism, for conditioning the system of Fig. 2 for automatic control of the engine-speed within the braking-range, is similar to that shown in Fig. 1, except that one only, instead of two of the double-pole double-throw switches are required, this b— true for the reason that, in the syst— nly one of the pitch-chan— . The single re— ntrols —, and ls as the corresponding switch in Fig. 1, hereinbefore described with reference thereto.

In the switch 230 of Fig. 2, the posts 234 and 236 normally transmit current through suitable conductors to the solenoid coils 179 and 177, respectively, of the direction control switch 157, whereby the piston rod 175 is moved downward or upward respectively, for pitch-increase or pitch-decrease. Obviously, the closing of the governor-controlled switch 204 will complete electrical connection for pitch-increase as long as the reversing switch 230 is in the condition shown, but will complete connection for opposite rotation when the solenoid core 256 moves to the left and engages part 252 with 236. Similarly, the closing of the governor controlled switch 208 normally completes connection for pitch-decrease as long as the reversing switch 230 is in the condition shown, but will complete connection for opposite rotation when the solenoid core 256 moves to the left and engages part 250 with part 234. The solenoid coil 258 is energized through a cam-operated switch 404, the cam of which is advanced or retarded as a function of air speed, so that the dividing line between the flight-pitch-range and the braking-pitch-range shifts off the 0 pitch-angle according to the air speed of the craft.

The push buttons 103, 105, and 107 are provided for braking, unbraking and feathering, respectively, and since each of these functions is performed at the high rate of pitch change, it is obvious that the depressing of either of these buttons must energize a coil 165 of the speed control valve 155. Also, since unbraking and feathering both call for rotation of the propeller blades in a pitch-increasing direction, the coil 179 of the direction control valve 157 must be energized whenever button 105 or 107 is depressed, and since braking calls for rotation of the blades in a pitch-decreasing direction, the coil 177 must be energized upon depression of the push button 103.

Since automatic governor control may not remain in effect when either of the manual push buttons 103, 105, or 107 is depressed, it follows that depression of either of these buttons must complete connection to the appropriate valve-operating coils 165, 177 or 179, irrespective of the governor switches 204, 206, 208 or 210, and irrespective of the reversing switch mechanism 230. Accordingly, current is brought from a point just past the main switch 407 to a double pole switch 251, which directs current to valve operating coils 165 and 179, and the unlocking coil 229 for increasing pitch at a high rate whenever the pitch-increase solenoid coil 253 is energized. The pitch-increase solenoid coil 253 is energized upon depression of either push button 105 or 107, current passing respectively through the cam-operated switches 430 or 322 until they are opened at the proper degree of pitch-increase. Current is also brought to the double pole switch 255, which directs current to the valve operating coils 165 and 177, and the unlocking coil 233 for decreasing pitch at a high rate whenever the pitch-decrease solenoid coil 257 is energized. The pitch-decrease solenoid coil 257 is energized upon depression of the push button 103, current passing through the cam-operated switch 440 until it is opened at the proper degree of pitch-decrease.

The air-speed-responsive mechanism 330 shown in detail in Fig. 3, and described with respect to its employment in the system Fig. 1, is used without change in structure in the modification Fig. 2, the detail parts being given the same numerals therein. To provide for situations where a fine adjustment of pitch is required, the double-throw switch 85 is provided and electrically connected to selectively energize either the coil 179 or the coil 177 for a low rate of pitch change in one or the other direction. Automatic pitch limit stop switches 325 and 447 are provided for preventing use of the manual switch to increase pitch beyond the feathering angle or decrease it beyond the desired angle in the braking range, the switches 325 and 447, and the cams 318 and 438 which operate them, being duplicative of those shown and described with reference to Fig. 1. The manner in which it is drivably connected to its source of rotation, however, differs in that, in the structure shown in Fig. 2, the differential gear-set 284 of Fig. 1 is not required, for the reason that the source of rotation in Fig. 2 is the single rotatable ring gear 68 instead of the two rotatable ring gears 68 and 70 of Fig. 1.

In Fig. 2, a pinion 217 meshes with the external teeth of the ring gear 68, while intermediate gearing 219, 221, 223, 225 and 227 drivably connect the gear 229 on the shaft 282 to the ring gear 68, whereby rotation of the shaft 282 is always a function of the rotation of the ring gear 68, and, consequently, is a function of pitch-change.

The modification shown in Fig. 2 may be operated as follows:

Let it again be assumed that the engine has not yet been started. The main switch 407 should be closed, thus completing connection from the battery 378 to the Brake, Unbrake, and Feather push button switches 111, 113, and 115, as well as to the unlocking and valve operating switches 231, 251, and 255. Closing of any of the three above push button switches will now direct current through the cam-operated switches 440, 430 or 322 to the switch closing solenoids 227, 229, 253 or 257 for pitch-change.

If the propeller was left in the braking range at the last landing, it may be brought to a starting position by pressing the Unbrake button 105, which will complete a circuit through the now closed cam-operated switch 430 to the pitch-increasing solenoid coil 253, whereupon the switch 251 will close, and current will be directed to the solenoid coil 235 for releasing the locking clutch 201, to one of the solenoid coils 165 for operating the speed control valve 155 to its high rate position, and to the solenoid 179 for setting the direction-of-rotation valve 157 to the pitch-increasing position.

By observation of the pitch indicator dial 316, the Unbrake push button may be released and pitch-change stopped at the desired positive pitch position for starting, or it may be released as near this position as convenient and the finer adjustment for starting position achieved with the manual low rate pitch change switch 85.

After the engine is started, warmed, and let down to its idling speed, the Unbrake button may again be pushed and held until the green light 436 lights and indicates that the pitch change has been stopped by the Unbrake cam 428 at the mid point in the low-speed flight-range. The Automatic push button 109 may now preferably be depressed, after which the pitch will be automatically set to a point commensurate with the take-off throttle setting, which will be at the discretion of the pilot.

If, on the other hand, the propeller has been left in the feathered position, the pilot may preferably press the Brake push button 103 to complete a circuit through the now closed cam-operated switch 440, to the switch-closing solenoid 257, whereupon the switch 255 will close, and current will be directed to the solenoid 227 for releasing the locking clutch 201, to a solenoid coil 165 for operating the speed-control valve 155 to its high rate position, and to the solenoid coil 177 for setting the direction-of-rotation valve 157 to the pitch-decreasing position.

By observing the pitch indicator dial 316, the Brake push button may be released, and pitch change stopped near the position desired for starting, the more exact position being subsequently achieved with the low rate pitch change switch 85. After the engine is operating satisfactorily, the pitch may be set to the mid point of the low-speed flight-range with the Unbrake button by observing when the green light 436 lights. The Automatic push button 109 will now be put down and anchored, whereupon the pitch will be automatically brought to an angle which will maintain the engine constant at whatever speed the throttle setting calls for, whether in take-off or in flight.

Where a propeller has been full feathered with the push button 107, and necessary repairs made to the engine during flight, the engine may be started by bringing the propeller to a slight positive pitch-angle with the switch 85 and windmilling the engine for starting, and when the engine is performing satisfactorily, the same switch or the Brake push button may bring the pitch to the mid point of the low-speed flight-range, after which automatic governing may be initiated, as before explained.

In initiating automatic pitch-change, the auxiliary switch 415 should be closed, whereby the master motor 120 is started, then the Automatic push button 109 should be put down and anchored, whereby the coils of the clutches 156 and 136 are energized and connection is made to the cam-operated switches 414 and 420, provided for respectively lighting a green or a red signal light 416 or 422 whenever the pitch is brought within 5 degrees from the correct angle for the then existing air speed; and connection is made to the governor-operated switches 204, 206, 208 and 210, all as described with reference to Fig. 1. Further manipulation of the push button controls in cruising, braking, unbraking or feathering has also been adequately described with reference to Fig. 1, of which Fig. 2 is only the hydraulic analogy.

Having thus briefly described my invention, I claim:

1. In an aircraft propeller, blades rotatable about their axes to change the pitch, means for changing the pitch whereby the airspeed may change in correspondence therewith, a differential gear-set comprising two differential gears, differential pinions for connecting said gears, and a carrier for revolving said pinions, means for connecting one of said gears to the pitch-change means, whereby rotatable displacement of said one gear is a function of pitch-change, an airspeed-responsive device for rotating said carrier as a function of air speed, and pitch-limit stop means connected to the other gear, whereby pitch-change is stopped when pitch is out of correspondence a predetermined amount with the air speed.

2. In an aircraft propeller, propeller blades rotatable about their axes to change their pitch, pitch-changing means whereby the airspeed normally changes at a rate corresponding to the rate of pitch change, a pitch-change-arresting means, a differential gear-set comprising two gears, pinions connecting said gears, and a carrier for revolving said pinions, pitch-change connecting means for drivably connecting one of said gears to the pitch-changing means, means connecting the other of said gears to a pitch-change-arresting means, and an air-speed-responsive device, drivably connected to said carrier, adapted, when the air speed coincidentally changes at the rate corresponding to the rate of pitch-change, to rotatably displace said carrier, with respect to the gear which is connected to the pitch-changing means, to such an extent as will leave the pitch-change-arresting means substantially nonrotative.

3. The device defined in claim 2, wherein the pitch-changing means includes electric switches, normally closed to allow pitch-change, and cams on the pitch-change-arresting means for opening said switches, said cams being connected to operatively rotate both as a function of blade pitch and air speed.

4. The device defined in claim 2, wherein the pitch-changing means includes electric switch means, normally closed to allow pitch-change, and other electric switch means, normally closed to operate signaling means, and cam means on the pitch-change-arresting means for opening both said switch means whenever the blade-pitch reaches a predetermined value, said value varying both as a function of the geometric blade pitch and the forward air speed of the aircraft.

5. In an aircraft propeller, propeller blades rotatable about their axes to change their pitch, pitch-changing means, a pitch-change indicating means rotatable by said pitch-changing means, a differential gear-set comprising two equal gears, pinions connecting said gears, and a carrier for revolving said pinions, one of said gears being drivably connected to said pitch-indicating means, a pitch-change-arresting means connected to the other said gear to be rotated thereby for arresting pitch change, and an air-speed-responsive device drivably connected to said carrier adapted, when the rate of pitch change corresponds substantially to the rate of air speed change, to rotate said carrier in the same direction as the pitch indicating means but through half the rotative displacement, whereby the pitch-arresting means is substantially nonrotative.

6. The structure defined in claim 5 with an electric switch openable for arresting pitch-change, and a cam drivably connected for rotation in unison with said pitch-change indicating means, adapted for opening said switch when the pitch-changing means has reached the blade feathering position.

7. The device described in claim 5 with an electric switch openable for arresting pitch-change, a second switch closable for operating an electric signal, and a cam drivably connected for rotation in unison with said pitch-change indicating means, adapted, when the blade pitch has reached a feathering position, to open the first said switch and close the second.

8. The device of claim 5 with a series of electric switches operable for controlling pitch-change, a cam drivably connected for rotation in unison with said pitch-change indicating means, adapted for opening one switch when the pitch-changing means has reached the feathering position, cam means drivably connected to said pitch-change-arresting means, adapted for opening other of the switches when the pitch and the air speed become substantially out of correspondence, and cam means also drivably connected to said pitch-change-arresting means adapted while said pitch and said air speed remain substantially in correspondence to remain closed and operate an electric signal.

9. A governor comprising a constant speed element, a device, the speed of which is to be controlled, a part movable to change the speed of said device, a means connecting said element and said device, adapted to be moved from a neutral position by the difference between the rotative speeds at which said element and said device are moving, a low speed servo-mechanism made operative for moving said part by a small movement of said means in response to a small difference in speed between said element and said device, a high-speed servo-mechanism, made operative for moving said part by a greater movement of said means in response to a greater difference in speed between said element and said device, and follow-up mechanism, associated with said governor, adapted for returning said means to the neutral position at a high or a low speed depending on whether the high or the low speed servo-mechanism is operating.

10. The governor of claim 9 with control means for controlling the speeds of the follow-up mechanism independently of the speeds of the servo-mechanism.

11. A governor for controlling the speed of an aircraft engine, comprising, in combination, a constant speed motor, a shaft rotatable as a function of engine speed, a propeller having blades adjustable for changing the speed of said engine and said shaft, a three-part differential having one part connected to said constant speed motor, a second part connected to said shaft, and the third part movable from a neutral position in response to a difference between the rotative speeds of the said motor and the said shaft, a low-rate of pitch-change servomotor operative for adjusting said blades at a low rate by a small movement of said third part in response to a small difference in speed between said constant speed motor and said shaft, a high-rate-of-pitch-change servomotor operative for adjusting said blades at a high rate by a greater movement of said third part in response to a greater difference in speed between said constant speed motor and said shaft, and a follow-up motor differentially connected to one of said parts for returning said third part to the neutral position at a high or a low rate depending on whether the high or the low rate servomotor is in operation.

12. The device of claim 11 wherein the first servomotor continues in operation while the second is operating to provide a faster rate of pitch-change.

13. The structure of claim 11 with an air-speed-responsive mechanism which includes electric switch means and means for opening said switch means for arresting rotation of the servomotors whenever the blade pitch is more than a preselected degree out of correspondence with the air speed.

14. The pitch-changing device of claim 11 with a servomotor-arresting means rotatable from an inoperative to an operative position, an air-speed-responsive means, and a three-element differential having one element drivably connected to the servomotor arresting means, the second element drivably connected to the blades, and the third element drivably connected to the air-speed-responsive means, said air-speed-responsive means being so proportioned that whenever the pitch and the air speed are substantially commensurate, the servomotor-arresting means remains in the unoperated position, and whenever the pitch and the air speed are not substantially commensurate, the servomotor-arresting means moves from its inoperative position to stop the servomotors until the air speed and the geometric blade pitch reach predetermined values.

15. The combination, in a governor for maintaining a constant speed in an aircraft engine having a propeller, of propeller blades rotatable about their axes to change their pitch, a constant speed motor, low and high rate servo-mechanism connected to said blades for changing their pitch at a low or a high rate, a three-element servo-differential, a follow-up motor, a three-element follow-up differential, means drivably connecting one of the elements of the servo-differential to one of the elements of the follow-up differential, means drivably connecting the second element of the servo-differential to the constant speed motor, means drivably connecting the second element of the follow-up differential to the engine, means drivably connecting the follow-up motor, to the third element of the follow-up differential, low and high rate servo-actuating switches, and means on the third element of the servo-differential operative by a slight difference in the speeds of the first and second elements of the servo-differential to close the first switch, and by a greater difference in the speeds of the first and second elements of the servo-differential to close the second switch.

16. The governor of claim 15, with two electromagnetic clutch-and-brake means, one inserted in the drive between the constant speed motor and the servo-differential and the other inserted in the drive between the follow-up differential and the engine, and a manual control means operative to coincidentally make electrical connection to the servo-actuating-switches and the electromagnets of said clutch-and-brake means, said clutch-and-brake means comprising brake means for normally holding the said drives nonrotative, and means operative by said electromagnets to complete said drives.

17. The governor of claim 15, with a signaling means, an air-speed-responsive means, and a three-element differential having one element drivably connected to the signaling means, the second element drivably connected to the blades, and the third element drivably connected to the air-speed-responsive means, said air-speed-responsive means being so proportioned that, whenever the pitch and the air speed are substantially in agreement, the signaling means remains operative, and whenever the pitch and the air speed are not substantially in agreement, the signaling means becomes inoperative.

18. The pitch-changing device of claim 15 with mechanism for arresting servomotor operation when pitch is being changed thereby a predetermined amount out of correspondence with air speed, said mechanism comprising an air-speed-responsive device, servomotor arresting switches operative to interrupt current being supplied to the servomotors through the servomotor actuating switches, rotatable cam means for operating said arresting switches, a three-element air speed differential having one element drivably connected to the rotatable cam means, a second element drivably connected to the propeller blades, and a third element drivably connected to the air-speed-responsive device, said air speed responsive device being so proportioned that it rotates the third element half as fast as the blades are rotating the second element when the air speed and the pitch are changing correspondingly, whereby the rotatable cam means remains substantially non-rotative, and pitch-change is not arrested thereby as long as pitch-change and air speed change are substantially in agreement.

19. In a variable pitch propeller for an aircraft engine, propeller blades rotatable about their axes to change their pitch, a servo-mechanism, a governor responsive to off-speed conditions of the engine for controlling said servo-mechanism for movement in one or the other direction for increasing or decreasing the pitch, reversing means normally operative, when the air speed is zero, to reverse the governor-to-servo connections at the blade setting for zero thrust, whereby the governor condition, which normally operated the servo-mechanism in one direction, will operate it in the other direction, an air-speed-responsive mechanism for controlling said reversing mechanism, operative to change the point of reversal of the reversing means in proportion to the air speed, whereby reversal will occur substantially at the point of zero thrust, and manual means for controlling the servo-mechanism to bring the pitch past the point of zero thrust.

20. In a variable pitch propeller for an aircraft engine, propeller blades rotatable about their axes to change their pitch, a first electromagnet energizable for pitch increase, a second electromagnet energizable for pitch decrease, two electric switches for connecting a power source to said electromagnets, a governor operative by underspeed or overspeed conditions of the engine to close one or the other of said switches, electrical connections between said switches and said electromagnets, a reversing switch in said connections adapted, when operated, to connect that switch, which normally directed current to one electromagnet, to the other electromagnet, means drivably connected to the blades for operating said reversing switch, adapted, at zero air speed, to operate said reversing switch when the blade passes the zero thrust setting, and an air speed-responsive means in the drive, adapted to shift the operating point of the reversing switch to a higher positive pitch-angle as the air-speed increases, whereby reversal will always occur substantially at the point of zero thrust, and a manual means for operating the servo-mechanism to move the pitch past the point of zero thrust.

21. In a variable pitch propeller system, propeller blades rotatable about their axes to change their pitch, two electromagnetic means, one for controlling pitch increase and the other for controlling pitch decrease, an electric switch for directing current from a current source to each electromagnetic means, a governor, operative upon overspeed or underspeed of the engine to close one or the other of said switches, conductors electrically joining said switches to said electromagnetic means, a reversing switch between said governor-operated switches and said electromagnetic means, adapted, upon operation, to connect the electromagnetic means, which is normally connected to one governor-operated switch, to the other governor-operated switch, a shaft rotatable as a function of pitch-change, a three-element differential having one element fast on said shaft, a rotatable member fast on the second element and an air-speed-responsive device connected to rotate the third element, means operative by said rotatable member for operating said reversing switch, said means being so positioned that when the air speed is zero, the reversing switch will be operated when the pitch setting is that for zero thrust, but will be shifted from the zero-air-speed setting in proportion as the air speed increases, and manual switches for controlling the electromagnetic means independently of the governor-operated switches for increasing or decreasing the pitch past the point of zero thrust.

22. The structure defined in claim 21 with automatic means for overriding said manual switches, adapted for stopping pitch-change and operating a signal when pitch-increase has substantially reached the mid point in the positive thrust range or pitch decrease has substantially reached the mid point in the braking or reverse thrust range, said automatic means being carried on said rotatable memebr whereby said mid points shift substantially in correspondence with changes in air speed.

23. In a variable pitch propeller for an aircraft engine, propeller blades rotatable about their axes to change their pitch, a pitch-change servo-mechanism, a governor mechanism sensitive to off-speed conditions of the engine for automatically operating the servo-mechanism to correct the engine speed by changing the pitch, manual means adapted to override governor control of the servo-mechanism and operate it to selectively bring the pitch into the positive thrust range or the braking, or reverse thrust range, a first part rotatable as a function of pitch-change, a three-element differential having one element connected to said first part, another element connected to an air-speed-responsive device, and another element connected to a second part, whereby said second part is rotatable as a function of pitch-change as modified by change in air speed, means operative by said second part, when said servo-mechanism moves the pitch past substantially the point of zero thrust, to change the governor sense, whereby the off-speed condition, which operated the servo-mechanism in one direction will operate it in the other direction, means operative by said second part to override said manual means to arrest pitch-change and operate a signal when the pitch has been brought by the manual means past the point of zero thrust to substantially the midpoint of either the positive thrust range or the braking or reverse thrust range, and means for fixing the governor for automatic operation of the servo-mechanism in either range.

24. In a variable pitch propeller for an aircraft engine, a pitch-changing hydraulic servo-mechanism which includes a hydraulic pump, a fluid motor hydraulically connected to said pump, a pitch-changing gear-set, means drivably connecting said motor to a gear of said gear-set, a direction control valve for said motor, operable to one or another position to rotate said motor in one or the other direction, a speed control valve operable to one or another position for permitting a large or a small volume of fluid through said motor for high or low speed operation, a manually operable means for coincidentally shifting the direction control valve to one position and the speed control valve to the high speed position, a second manually operable means for coincidentally shifting the direction control valve to the other position and the speed control valve to the high speed position, and automatic means, operative upon a slight off-speed condition of the engine to operate the direction control valve with the speed control valve in the low speed position and operative upon a greater off-speed condition to operate the direction control valve with the speed control valve in the high speed position.

25. The structure defined in claim 24, wherein the said valves are operated by electromagnetic coils and the manual means and the automatic means operate switches for connecting current to said electromagnetic coils.

26. The structure defined in claim 24, wherein there is an accumulator in the hydraulic circuit, and said valves are operated by electromagnetic coils connected to a source of electrical energy, and a pressure responsive switch associated with said accumulator is adapted, upon failure to maintain pressure of a predetermined value in said accumulator, to break the electrical connection to said coils.

27. The structure defined in claim 24, wherein there is a locking means for holding the gear-set against moving to effect pitch change, and means energizable coincidentally with operation of said manual means or said automatic means to release said locking means.

28. In a governor controlled constant speed variable pitch propeller, blades rotatable about their axes to change the pitch, means for automatically reversing the governor sense when the blade pitch passes a selected pitch setting in the transition range from positive to negative thrust, and means for varying the point of operation of said reversing means as a function of air speed.

29. In a variable pitch propeller for aircraft, blade pitch limit stops with selective low pitch and high pitch settings in both the postive and negative thrust ranges, and means for varying said low and high pitch settings in both ranges as a function of air speed.

30. In a variable pitch propeller control for aircraft, governor controlled servo-mechanism responsive to a change in engine speed to vary the pitch of the propeller to maintain a selected propeller speed, an arresting means associated with said servo-mechanism having operative points spaced one from the other for limiting the angular change in pitch to a predetermined angle substantially less than the full range of pitch change of said propeller and means responsive to change in air speed of the aircraft to shift the operative points of the arresting means within the full range of pitch change while maintaining their spaced relation one with the other.

31. In a variable pitch propeller control for aircraft, governor controlled servo-mechanism responsive to a change in engine speed to vary the pitch of the propeller to maintain a selected propeller speed, a shiftable arresting means associated with said servo-mechanism having operative points at a fixed angular spacing one from the other for limiting the angular change in pitch to a predetermined angle substantially less than the full range of pitch change of said propeller and means responsive to a variation in the change in air speed of the aircraft with respect to the change in pitch of the propeller beyond a predetermined variation for shifting the operative points of said arresting means while maintaining their angular spacing one from the other.

32. In an aircraft propeller, propeller blades rotatable about their axes to change their pitch, means associated with said blades for changing the pitch, whereby the air speed may change so as to remain in correspondence therewith, and means for preventing the pitch being changed faster than the air speed may change into correspondence therewith.

33. In an aircraft propeller, propeller blades rotatable about their axes to change their pitch, a governor sensitive to changes in engine speed for changing the pitch whereby the air speed may be correspondingly changed, and an air speed responsive device adapted to arrest pitch change when the pitch angle, in changing, becomes more than a predetermined degree out of correspondence with the the changing air speed.

34. In an aircraft propeller, propeller blades rotatable about their axes to change their pitch, mechanism for changing the pitch whereby the air speed normally changes coincidentally at a definite rate with respect to the rate of pitch change, means movable as a function of pitch change, a second means movable as a function of the change in air speed, mechanism for arresting pitch change, a third means normally stationary but adapted when moved from its normal position to operate said pitch change arresting mechanism, and a three-element differential having one element connected to each said means, the rates of movement of the several elements of the differential being such that when the first and second said means are changing at the said definite rate the third means will remain stationary.

35. In an aircraft propeller, propeller blades rotatable about their axes to change the pitch, mechanism for changing the pitch whereby the air speed normally changes coincidentally with the change in pitch and at a definite rate with respect to the rate of pitch change, means rotatable as a function of pitch change, a second means rotatable as a function of the change in air speed, mechanism for arresting pitch change, a third means normally non-rotative but adapted when rotated from its normal position to operate said pitch change arresting mechanism, and a three-element differential gear set comprising two differential gears, differential pinions in mesh with said gears, and a carrier for said pinions, one differential gear being connected to the first said means, the carrier being gear connected to the second said means and the other differential gear being connected to the third said means.

36. A governor for controlling the speed of an aircraft engine, comprising, in combination, a constant speed motor, a shaft rotatable as a function of engine speed, a propeller having blades adjustable for changing the speed of said engine and said shaft, a three-part differential having one part connected to said constant speed motor, a second part connected to said shaft, and a third part movable from a neutral position in response to a difference between the rotative speeds of the said motor and the said shaft, a low-rate-of-pitch-change servomotor operative for adjusting said blades at a low rate by a small movement of said third part in response to a small difference in speed between said constant speed motor and said shaft, and a high-rate-of-pitch-change servomotor operative for adjusting said blades at a high rate by a greater movement of said third part in response to a greater difference in speed between said constant speed motor and said shaft.

37. In an aircraft propeller, propeller blades rotatable about their axes to change their pitch, pitch control mechanism comprising a servomechanism operable in one or the other direction for increasing or decreasing the pitch, one manually operable control means for operating the servomechanism in a pitch-decreasing direction, a second manually operable control means for operating the servomechanism in a pitch-increasing direction, and pitch-arresting mechanism movable as a function of pitch-change, operative, when the first said manually operable control means is in use, to override the first said manually operable control means and arrest pitch change at substantially the midpoint of the braking or reverse thrust pitch-range, and operative, when the said second manually operable control means is in use, to override the said second manually operable control means and arrest pitch change at substantially the midpoint of the positive thrust pitch range, and an air-speed-responsive device associated with said pitch control mechanism for shifting the points at which pitch change is overridden as a function of air-speed-change.

38. In a bladed propeller, propeller blades rotatable about their axes to change their pitch to control the propeller speed through both a positive and a negative pitch range, power means for rotating said blades either in a first direction for increasing the pitch or in a second direction for decreasing the pitch, a governor normally operative upon propeller overspeed to operate the power means to rotate the blades in the said first direction and upon propeller underspeed to operate the power means to rotate the blades in the said second direction, a reversing switch operable at some point in the transition between the positive and the negative range for changing the governor sense for causing said governor upon propeller overspeed to operate the power means to rotate the blades in the said second direction and upon propeller underspeed to operate the power means to rotate the blades in the said first direction, and an air speed sensitive device for shifting the point in the transition between the positive and the negative range at which the reversing switch acts, said point being a function of the air speed.

HOWARD M. McCOY.

REFERENCES CITED

The following references are of record in the file of this patent:

UNITED STATES PATENTS

| Number | Name | Date |
|---|---|---|
| 1,851,874 | Seppeler | Mar. 29, 1932 |
| 2,039,720 | Lambert | May 5, 1936 |
| 2,160,324 | Berges | May 30, 1939 |
| 2,228,776 | Mullen | Jan. 14, 1941 |
| 2,250,694 | Algarsson | July 29, 1941 |
| 2,291,953 | Dicks | Aug. 4, 1942 |
| 2,293,912 | Mullen | Aug. 25, 1942 |
| 2,301,434 | McNeil | Nov. 10, 1942 |
| 2,332,452 | Martin et al. | Oct. 19, 1943 |
| 2,313,795 | Algarsson | Mar. 16, 1943 |
| 2,314,025 | Waseige | Mar. 16, 1943 |
| 2,346,007 | Chillson | Apr. 4, 1944 |
| 2,346,979 | Lilley | Apr. 18, 1944 |
| 2,347,104 | Hoover | Apr. 18, 1944 |

FOREIGN PATENTS

| Number | Country | Date |
|---|---|---|
| 295,826 | Germany | Dec. 21, 1916 |
| 379,731 | Italy | Apr. 4, 1940 |
| 517,117 | Great Britain | Jan. 22, 1940 |
| 548,833 | Great Britain | Oct. 27, 1942 |